United States Patent
Higuchi et al.

(10) Patent No.: US 6,977,739 B2
(45) Date of Patent: *Dec. 20, 2005

(54) PRINTING APPARATUS AND ITS CONTROL METHOD

(75) Inventors: Yuichi Higuchi, Funabashi (JP); Takashi Kotani, Ichikawa (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 483 days.

(21) Appl. No.: 08/909,966

(22) Filed: Aug. 12, 1997

(65) Prior Publication Data

US 2004/0021891 A1 Feb. 5, 2004

(30) Foreign Application Priority Data

Aug. 23, 1996 (JP) ............................................. 8-222908

(51) Int. Cl.[7] ............................. G06F 3/12; G06F 13/00
(52) U.S. Cl. ...................... 358/1.15; 358/1.13; 358/1.14
(58) Field of Search .............................. 358/1.1–1.18; 355/114, 115, 116, 117, 110, 111

(56) References Cited

U.S. PATENT DOCUMENTS

| | | | | |
|---|---|---|---|---|
| 5,594,653 A | | 1/1997 | Akiyama et al. | ...... 364/468.24 |
| 5,700,003 A | * | 12/1997 | Sung | .......................... 271/110 |
| 5,740,368 A | * | 4/1998 | Villalpando | ............ 395/200.32 |
| 5,740,513 A | * | 4/1998 | Matsuo et al. | ............... 399/333 |
| 5,791,790 A | * | 8/1998 | Bender et al. | ................. 400/61 |
| 5,800,081 A | | 9/1998 | Teradaira et al. | ............. 400/74 |
| 5,812,745 A | * | 9/1998 | Kim et al. | ................... 395/113 |
| 5,859,956 A | * | 1/1999 | Sugiyama et al. | .......... 395/112 |
| 5,867,720 A | | 2/1999 | Hirano | ................... 395/750.06 |
| 5,872,635 A | | 2/1999 | Akiyama | ..................... 358/296 |
| 5,940,653 A | | 8/1999 | Maekawa et al. | ............... 399/9 |
| 6,021,284 A | | 2/2000 | Serizawa et al. | .............. 399/8 |
| 6,100,996 A | | 8/2000 | Amano et al. | ............... 358/1.9 |

FOREIGN PATENT DOCUMENTS

| | | | | |
|---|---|---|---|---|
| JP | 7-225661 | 8/1995 | ............. G06F/3/12 |
| JP | 8-224923 | 9/1996 | |

* cited by examiner

Primary Examiner—Gabriel Garcia
Assistant Examiner—Douglas Tran
(74) Attorney, Agent, or Firm—Fitzpatrick, Cella, Harper & Scinto

(57) ABSTRACT

When an engine detects changes in condition such as a power-OFF operation, an out-of-paper state, or the like, it sends a condition change signal indicating that the condition has changed to an engine control unit. The engine control unit inquires of the engine as to the contents of the changes in condition using a command signal so as to examine the cause of the changes in condition. When a power supply is scheduled to be turned off, a message indicating it is supplied to a host computer that uses the printer, or job conditions are saved, and the host apparatus is informed of the saved job conditions after the power supply is turned on again. In the case of the out-of-paper state as well, a message indicating it is supplied to the host computer that uses the printer. The items to be informed can be selected from the host computer.

9 Claims, 20 Drawing Sheets

| JOB NAME | OUTPUT CONDITION |
|---|---|
| JOB 1 | OUTPUT IN PROGRESS |
| JOB 2 | READY TO OUTPUT |
| JOB 3 | DATA RECEPTION IN PROGRESS |

FIG.13

| JOB NAME (401) | NETWORK ADDRESS (402) | PROCESSING CONDITION (403) |
|---|---|---|
| JOB 1 (404) | 100.10.10 | PRINTING IN PROGRESS |
| JOB 2 (405) | 100.10.11 | READY TO PRINT |
| JOB 3 (406) | 100.10.12 | DATA RECEPTION IN PROGRESS |

PRINTING APPARATUS AND ITS CONTROL METHOD

BACKGROUND OF THE INVENTION

1. Field of the Invention

The present invention relates to a printing apparatus which informs a host apparatus of condition changes such as a power-OFF state, out-of-paper state, and the like, and a control method of the apparatus.

2. Related Art

Conventionally, in a printing apparatus of this type, the power switch of a printer is directly connected to a power supply, and when the power switch is turned off, the power supply also goes off immediately. For this reason, since the printer power supply goes off immediately after the printer power switch is turned off, the host apparatus cannot be informed of the power-OFF operation. Even when data to be output still remains upon power OFF of the printer, the host apparatus cannot be informed of it.

In the conventional printing apparatus, even when the remaining paper quantity has changed, the printer engine does not issue any message indicating it, and the printer controller that controls the engine requests status of the engine to detect changes in remaining paper quantity. In a network system that shares a printer, a host apparatus which does not use that printer is also informed of information associated with the remaining paper quantity read out from the engine to the controller.

A conventional network management utility of the host apparatus that uses such a printer issues condition inquiries at given intervals to the printer, thereby detecting condition changes. For this reason, when the printer is connected to the network, some host apparatuses often recognize the printer as an active one although the power supply of that printer is OFF.

Since the remaining paper quantity in the conventional printer is periodically detected by the printer controller, even when the remaining paper quantity has changed, the latest remaining quantity cannot be detected before the next detection. Also, since all the host apparatuses are informed of the detected remaining paper quantity, such information increases the communication traffic of the network.

Also, since the host apparatus periodically acquires condition changes in the conventional printer, accurate condition changes cannot be detected in real time before the next detection even when the conditions of the printer have changed. Also, a host computer can designate neither the types of condition change information of the printer nor the host computers to be informed of that information.

SUMMARY OF THE INVENTION

The present invention has been made in consideration of the above-mentioned prior art, and has as its first object to provide a printing apparatus and its control method, which can give a power-OFF notice to a host apparatus, and can inform the host apparatus of data that cannot be printed.

It is the second object of the present invention to provide a printing apparatus and its control method, which allow a host apparatus to always detect the latest remaining paper quantity since an engine informs a printer controller of changes in remaining paper quantity, and to provide a printing apparatus and its control method, which do not output unnecessary information onto a network in a network environment.

It is the third object of the present invention to provide a printing apparatus and its control method, which can quickly inform a host apparatus of condition changes that have occurred in the printer, and can designate the types of condition changes to be informed in correspondence with the types of host apparatuses.

In order to achieve the first object, a printing apparatus of the present invention comprises the following arrangement.

That is, a printing apparatus for printing data corresponding to a print job received from a host apparatus, comprises:

determination means for determining based on a signal indicating that a condition of the printing apparatus has changed if a new condition corresponds to a power-OFF notice;

informing means for supplying information indicating that a power supply is scheduled to be turned off to the host apparatus when the determination apparatus determines that the new condition corresponds to the power-OFF notice; and control means for controlling to turn off the power supply after the informing means supplies the information.

Alternatively, a printing apparatus for printing data corresponding to a print job received from a host apparatus, comprises:

determination means for determining based on a signal indicating that a condition of the printing apparatus has changed if a new condition corresponds to a power-OFF notice;

storage means for storing a condition of the print job from the host apparatus in a nonvolatile storage medium when the determination means determines that the new condition corresponds to the power-OFF notice;

control means for controlling to turn off a power supply after storage by the storage means; and informing means for, when the power supply is turned on again, supplying information of an incomplete print job to the host apparatus on the basis of the print job condition stored by the storage means.

Alternatively, a method of controlling a printing apparatus for receiving a print job from a host apparatus and printing out data corresponding to the job from an engine unit, comprises:

the determination step of determining based on a signal indicating that a condition of the printing apparatus has changed if a new condition corresponds to a power-OFF notice signal;

the informing step of supplying information indicating that a power supply is scheduled to be turned off to the host apparatus when it is determined in the determination step that the new condition corresponds to the power-OFF notice signal; and the control step of controlling to turn off the power supply after the information is supplied in the informing step.

Alternatively, a method of controlling a printing apparatus for printing data corresponding to a print job received from a host apparatus, comprises:

the determination step of determining based on a signal indicating that a condition of the printing apparatus has changed if a new condition corresponds to a power-OFF notice signal;

the storage step of storing a condition of the print job from the host apparatus in a nonvolatile storage medium when it is determined in the determination step that the new condition corresponds to the power-OFF notice signal;

the step of turning off a power supply after the storage in the storage step; and the informing step of supplying information of an incomplete print job to the host apparatus on the basis of the print job condition stored in the storage step when the power supply is turned on again.

Alternatively, a computer readable storage medium that stores a program for printing out data corresponding to a print job received from a host computer, the program comprises:

a code of the determination step of determining based on a signal indicating that a condition of the printing apparatus has changed if a new condition corresponds to a power-OFF notice;

a code of the informing step of supplying information indicating that a power supply is scheduled to be turned off to the host apparatus when it is determined in the determination step that the new condition corresponds to the power-OFF notice; and a code of the control step of controlling to turn off the power supply after the information is supplied in the informing step.

Alternatively, a computer readable storage medium that stores a program for printing out data corresponding to a print job received from a host computer, the program comprises:

a code of the determination step of determining based on a signal indicating that a condition of the printing apparatus has changed if the changed condition corresponds to a power-OFF notice signal;

a code of the storage step of storing a condition of the print job from the host apparatus in a nonvolatile storage medium when it is determined in the determination step that the new condition corresponds to the power-OFF notice signal;

a code of the step of turning off a power supply after the storage in the storage step; and a code of the informing step of supplying information of an incomplete print job to the host apparatus on the basis of the print job condition stored in the storage step when the power supply is turned on again.

Furthermore, in order to achieve the second object, the present invention comprises the following arrangement.

That is, a printing apparatus which is connected to a host apparatus and prints out data corresponding to a print job received from the host apparatus from an engine unit, comprises:

determination means for determining based on a signal indicating that a condition of the printing apparatus has changed if the change in condition corresponds to a change in remaining paper quantity; and informing means for informing the host apparatus of the change in remaining paper quantity when the determination means determines that the change in condition corresponds to the change in remaining paper quantity.

Alternatively, a method of controlling a printing apparatus which is connected to a host apparatus and prints out data corresponding to a print job received from the host apparatus from an engine unit, comprises:

the determination step of determining based on a signal indicating that a condition of the printing apparatus has changed if the change in condition corresponds to a change in remaining paper quantity; and the informing step of informing the host apparatus of the change in remaining paper quantity when it is determined in the determination step that the change in condition corresponds to the change in remaining paper quantity.

Alternatively, a computer readable storage medium which is connected to a host apparatus and stores a program for processing a print job from the host apparatus, the program comprises:

a code of the determination step of determining based on a signal indicating that a condition of the printing apparatus has changed if the change in condition corresponds to a change in remaining paper quantity; and a code of the informing step of informing the host apparatus of the change in remaining paper quantity when it is determined in the determination step that the change in condition corresponds to the change in remaining paper quantity.

In order to achieve the third object, the present invention comprises the following arrangement.

That is, a printing apparatus which is connected to a host apparatus and prints out data corresponding to a print job received from the host apparatus from an engine unit, comprises:

storage means for storing condition change items designated by the host apparatus;

determination means for determining, based on a signal indicating that a condition of the printing apparatus has changed, an item of the condition change;

discrimination means for discriminating with reference to the items stored in the storage means if the item determined by the determination means corresponds to one of the items stored in the storage means; and informing means for informing the host apparatus that designated the corresponding item of the condition change item determined to correspond to the stored item by the discrimination means.

Alternatively, a method of controlling a printing apparatus which is connected to a host apparatus and prints out data corresponding to a print job received from the host apparatus from an engine unit, comprises:

the storage step of storing condition change items designated by the host apparatus;

the determination step of determining, based on a signal indicating that a condition has changed, an item of the condition change;

the discrimination step of discriminating with reference to the items stored in the storage step if the item determined in the determination step corresponds to one of the items stored in the storage step; and the informing step of informing the host apparatus that designated the item of the condition change item determined to correspond to the stored item in the discrimination step.

Alternatively, a computer readable storage medium which is connected to a host apparatus and stores a program for processing a print job from the host apparatus, the program comprises:

a code of the storage step of storing condition change items designated by the host apparatus;

a code of the determination step of determining, based on a signal indicating that a condition has changed, an item of the condition change;

a code of the discrimination step of discriminating with reference to the items stored in the storage step if the item determined in the determination step corresponds to one of the items stored in the storage step; and a code of the informing step of informing the host apparatus that designated the item of the condition change item determined to correspond to the stored item in the discrimination step.

With the above arrangement, the printing apparatus and its control method according to the present invention can supply a power-OFF notice to the host apparatus, and can inform the host apparatus of data that cannot be printed.

Upon reception of a condition change signal from the printer engine, it is recognized that the remaining paper quantity has changed. For this reason, information indicating that the remaining paper quantity has changed can be quickly supplied to the host apparatus connected to the network.

Also, since which host apparatus is to receive that information can be selected as needed, the communication traffic can be reduced.

Furthermore, the printer engine can quickly supply a condition change signal to the host apparatus connected to the network.

Moreover, since the host apparatus can designate condition change items to be detected, high-speed processing of a utility is attained.

In addition, since condition change items can be stored in correspondence with a supervisor and a normal user depending on their contents, the utility of the host apparatus becomes effective for the user.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a table showing an example of job names and printing states in the third embodiment;

DETAILED DESCRIPTION OF THE PREFERRED EMBODIMENTS

First Embodiment

Figure 1:
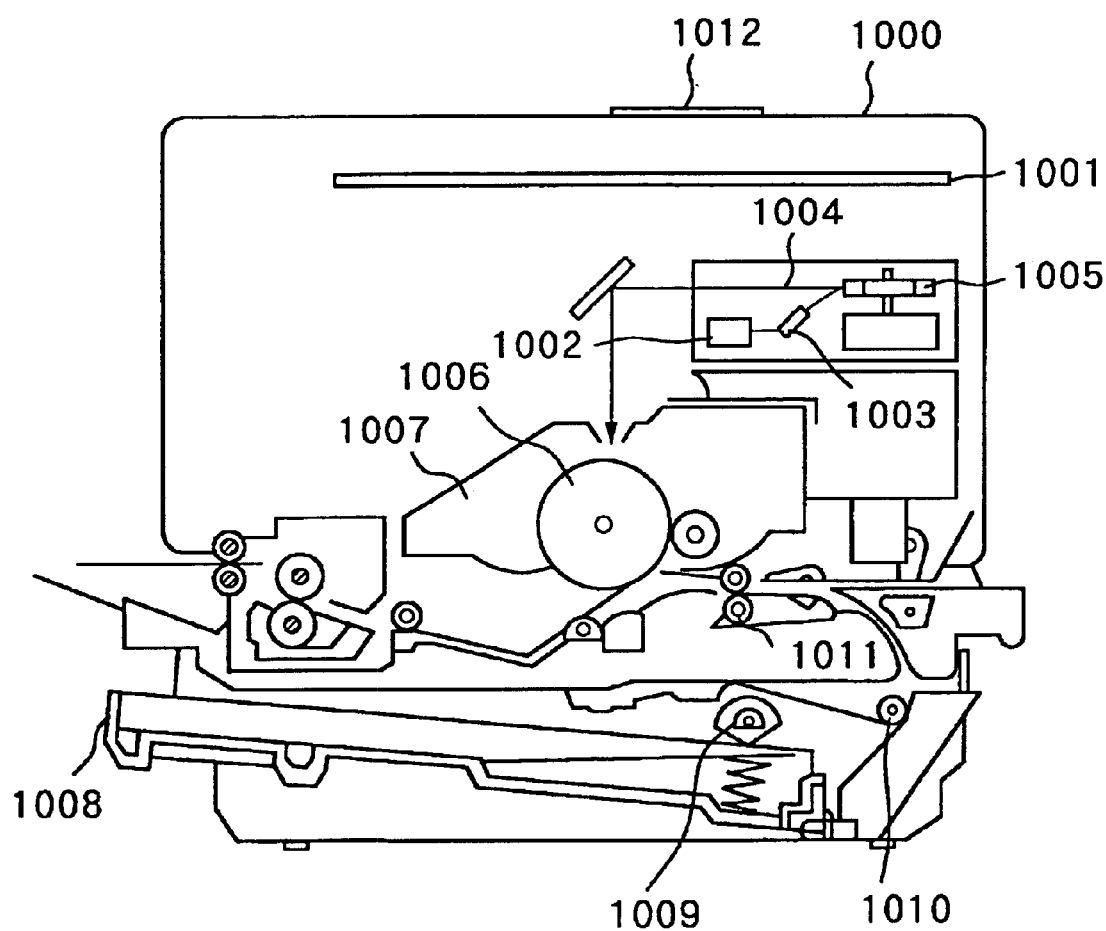
FIG. 1 is a sectional view of a printing apparatus according to the present invention.

FIG. 1 is a sectional view showing the internal structure of a laser beam printer (to be abbreviated as an LBP hereinafter) applied to this embodiment. This LBP is able to to register character patterns, standard formats (form data), and the like from a data source (not shown). Referring to FIG. 1, an LBP main body 1000 receives and stores character information (character codes), form information, macro commands, and the like supplied from an externally connected host computer (301, 302 in FIG. 3), generates corresponding character patterns, form patterns, and the like in accordance with such information, and forms an image on a recording paper sheet as a recording medium. An operation panel 1012 has operation switches, LED indicators, and the like. A printer control unit 1001 controls the overall LBP 1000, and analyzes character information supplied from the host computer. The printer control unit 1001 mainly converts character information into video signals of character patterns, and outputs them to a laser driver 1002.

The laser driver 1002 is a circuit for driving a semiconductor laser 1003, and turns on/off a laser beam 1004 to be emitted by the semiconductor laser 1003 in correspondence with input video signals. The laser beam 1004 is scanned in the right-and-left direction by a rotary polygonal mirror 1005, and is irradiated onto the surface of an electrostatic drum 1006. With this beam, an electrostatic latent image of character patterns is formed on the surface of the electrostatic drum 1006. The latent image is developed by a developing unit 1007 around the electrostatic drum 1006, and is transferred onto a recording paper sheet. A cut sheet is used as the recording paper sheet, and cut sheets are stacked in a paper cassette 1008 inserted into the LBP 1000. Each cut sheet is fed into the apparatus by a sheet feed roller 1009 and convey rollers 1010 and 1011, and is supplied to the electrostatic drum 1006.

Figure 2:
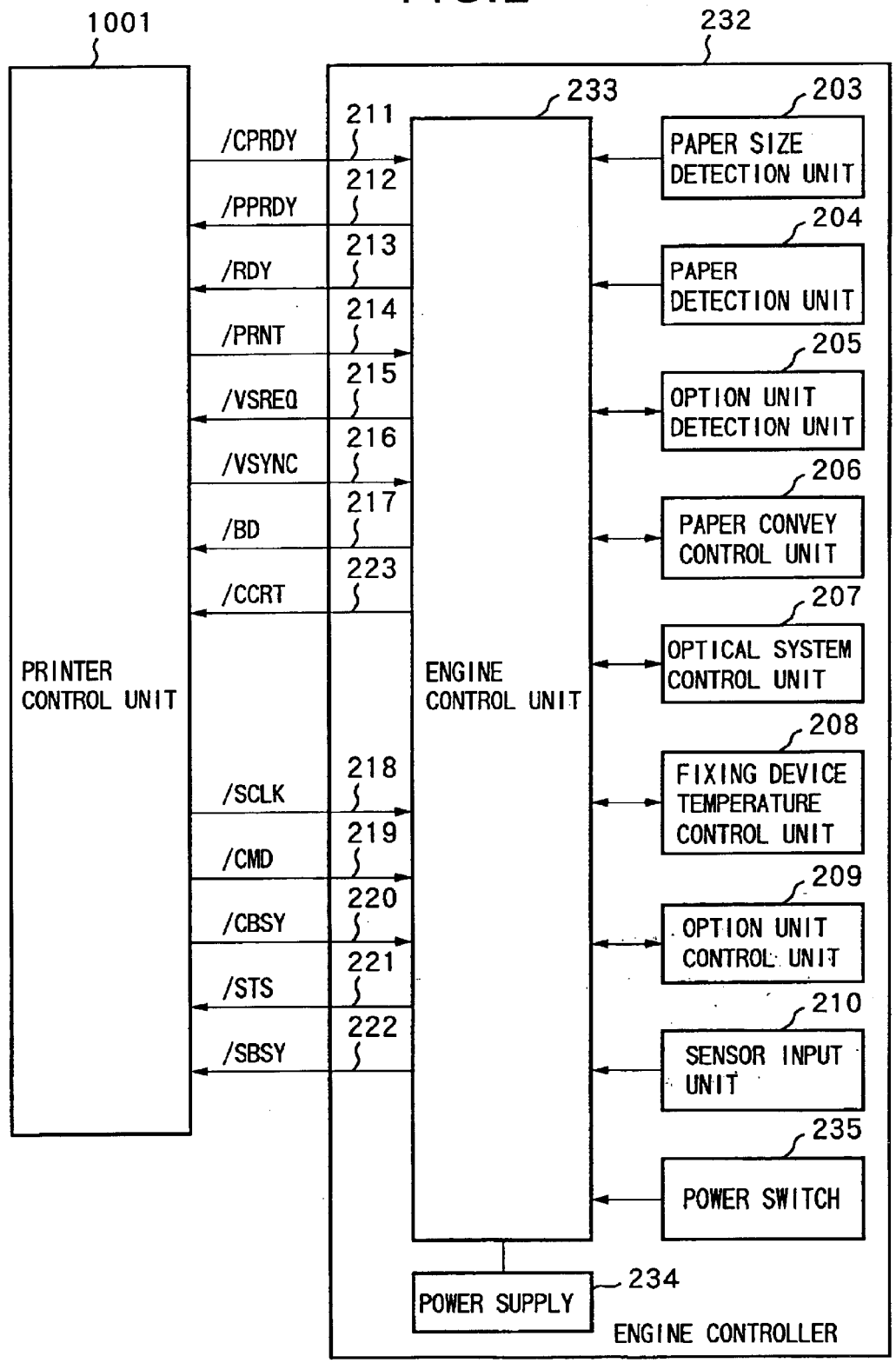
FIG. 2 is a block diagram showing a control unit of a printing apparatus of the first embodiment.

FIG. 2 is a block diagram of the printer control unit 1001. Referring to FIG. 2, the printer control unit 1001 receives image data via communications with the host computer, and develops the received image data into printable information. Furthermore, the printer control unit 1001 exchanges signals with a printer engine control unit (to be described below) via serial communications.

An engine control unit 233 controls the individual units in a printer engine by exchanging signals with the printer control unit via serial communications. A paper size detection unit 203 detects the paper size in the cassette, and supplies the detected information to the engine control unit. A paper detection unit 204 detects the presence/absence of paper sheets at the individual paper feed ports of the cassette, manual paper insertion port, option cassette, and envelope feeder, and supplies the detected information to the engine control unit 233. An option unit detection unit 205 checks the connection states of the individual option units such as the option cassette and envelope feeder. A paper convey control unit 206 performs paper convey control. An optical system control unit 207 controls an optical system such as a scanner motor, a laser, and the like. A fixing temperature control unit 208 performs temperature control, abnormality detection, and the like of a fixing device. An option unit control unit 209 issues operation instructions to the individual option units such as the option cassette and envelope feeder. A sensor input unit 210 includes a registration sensor, paper discharge sensor, double-sided printing sensor, reversal sensor, and the like for detecting the presence/absence of a paper sheet in the convey path.

A power supply unit 234 supplies electric power required for driving the entire printer, and is turned on/off by a power switch 235. In this embodiment, the power supply unit 234 continues to supply electric power until required processing is completed even after the power switch 235 is turned off. On the other hand, the power switch 235 also serves as a switch for directly turning on a power supply circuit itself. As the required processing, the engine control unit 233 drives a fan for preventing a temperature rise of the apparatus. For this purpose, the power supply unit 234 supplies electric power for, e.g., one minute after the switch 235 is turned off. By utilizing this interval, required processing for, e.g., informing the host computer of status data (5A01 in FIG. 23; to be described later) from the engine control unit 233 via the printer control unit 1001, is executed before the power supply is finally turned off.

Signals between the printer control unit 1001 and the engine control unit 233 will be explained below.

Figure 23:
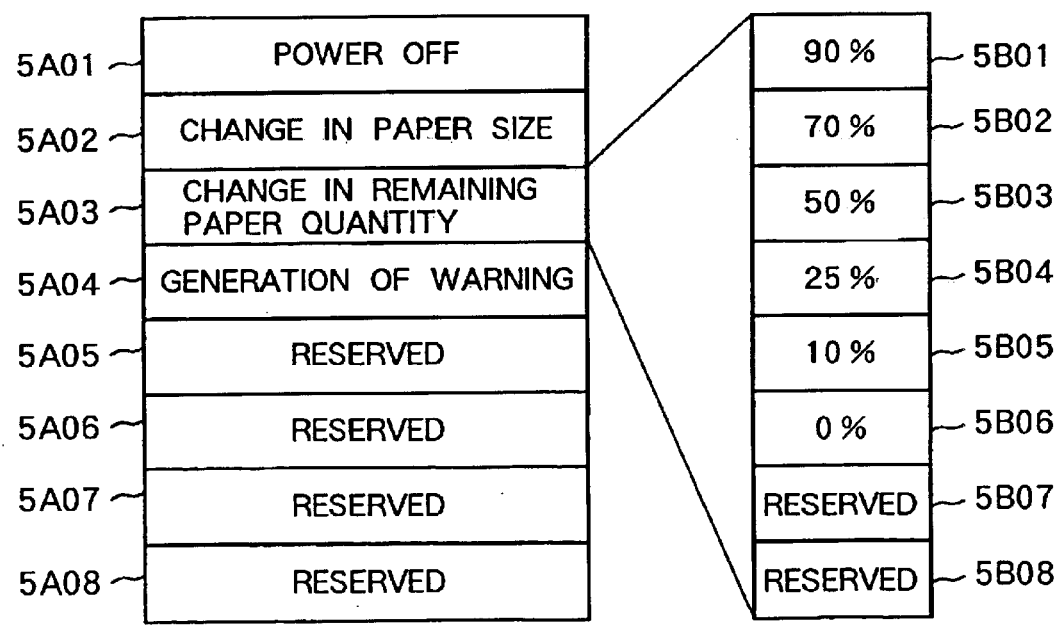
FIG. 23 is a table showing an example of signals/STS codes to be supplied from an engine to a control unit and its contents.

Reference numeral 211 denotes a /CPRDY signal indicating that the printer control unit 1001 is ready to communicate with the engine control unit 233; 212, a /PPRDY signal indicating the standby state in which the engine control unit 233 can communicate with the printer control unit 1001; 213, an /RDY signal indicating the standby state in which the engine control unit 233 is ready to print; 214, a /PRNT signal for issuing a print request from the printer control unit 1001 to the engine control unit 233; 215, a /VSREQ signal for requesting a vertical synchronization signal from the engine control unit 233 to the printer control unit 1001; 217, a /BD signal as a horizontal synchronization signal output from the engine control unit 233 to the printer control unit 1001; 218, an /SCLK signal as a synchronization clock signal for serial communications; 219, a /CMD signal as a command signal supplied from the printer control unit 1001 to the engine control unit 233; 220, a /CBSY signal as a strobe signal for outputting a command; 221, an /STS signal indicating the internal status of an engine and output in response to a command from the printer control unit 1001; and 222, an /SBSY signal for outputting status. Reference numeral 223 denotes a /CCRT (Condition Change Report) signal (condition change signal) that goes "TRUE" when the contents of status that is not directly associated with the /RDY signal of those of the engine, to inform the printer control unit 1001 of the changes. With this condition change signal, condition changes can be detected, and the actual state can be detected by the status signal 221. FIG. 23 shows an example of the codes of the status signal 221 and the contents of these codes. When the power switch 235 is turned off, the engine control unit 233 checks if the power supply can be turned off immediately. If it is determined that the power supply cannot be turned off immediately, the engine control unit 233 changes the condition change signal 223 to "TRUE" to notify in advance that the power supply is scheduled to be turned off. In this case, the status signal 221 assumes a value 5A01 that represents power OFF. Note that this /CCRT signal is described in Japanese Patent Laid-Open No.8-224923.

Figure 3:
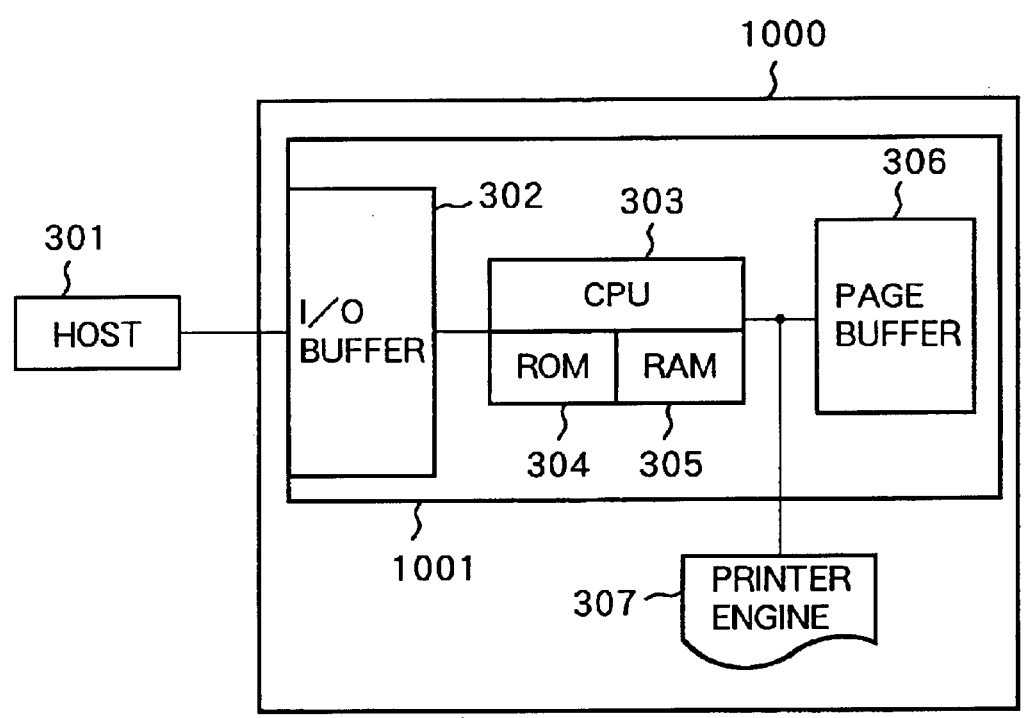
FIG. 3 is a block diagram showing a controller of the printing apparatus of the first embodiment.

FIG. 3 shows a block diagram of the LBP 1000 and the relationship between a data generation source and the LBP 1000. Note that reference numerals 302 to 306 in FIG. 3 denote constituting elements included in the printer control unit 1001 described above, and the arrangement of a printer engine 307 is as has been described above with the aid of FIGS. 1 and 2.

A host computer 301 serves as a data source for generating data. An I/O buffer 302 temporarily stores I/O data to/from the data source. A CPU 303 controls the printer control unit 1001. A ROM 304 stores a program shown in the flow chart to be described later and font patterns. A RAM 305 serves as a work area, and also stores the table shown in FIG. 5, and the like. A page buffer 306 stores the developed image in units of bands or pages. The printer engine 307 actually prints.

Figures 4, 5:
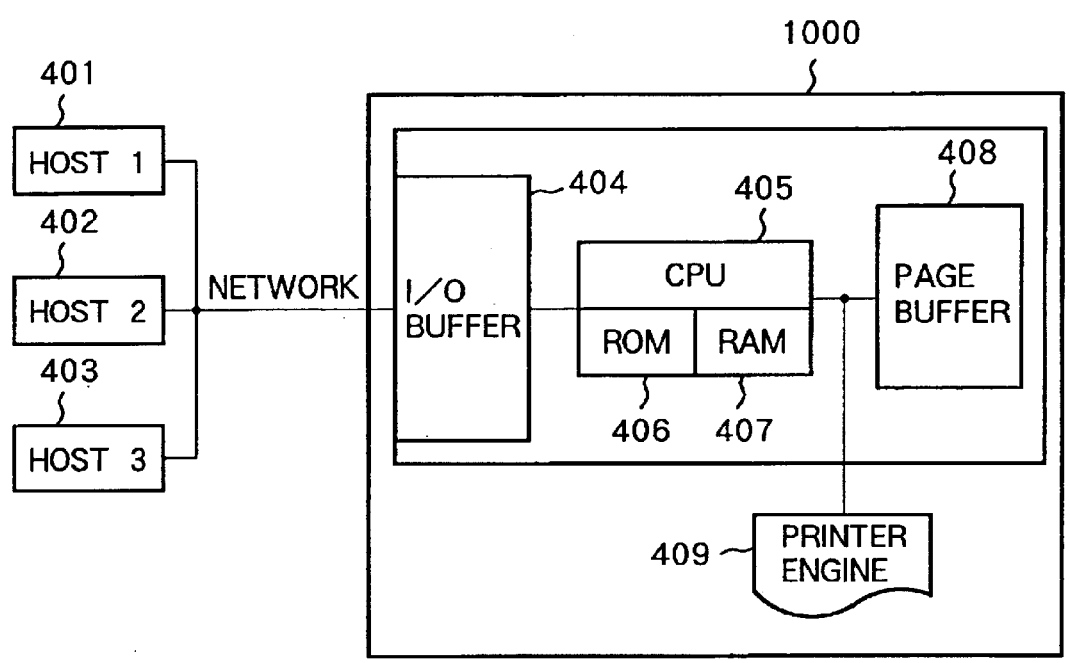
FIG. 4 is a block diagram of a controller of the printing apparatus of the first and second embodiments.
FIG. 5 is a table showing an example of job names and printing conditions in the first and second embodiments.

FIG. 4 shows a block diagram of the LBP connected to a network, and the relationship between the LBP and data generation sources (host computers). Note that reference numerals 404 to 408 in FIG. 3 denote constituting elements included in the printer control unit 1001 described above, and the arrangement of a printer engine 409 is as has been described above with the aid of FIGS. 1 and 2.

Host computers 401, 402, and 403 serve as data sources for generating data. An I/O buffer 404 temporarily stores I/O data to/from the individual data sources. A CPU 405 controls the printer control unit. A ROM 406 stores a program and font patterns. A RAM 407 serves as a work area, and a page buffer 408 stores the developed image. The printer engine 409 actually prints.

FIG. 5 is a status table showing an example of the conditions of data in the printer connected to the network. A job ID 501 indicates a job name in this example. The job name includes an identifier of the host computer as a job generation source, and a job serial number in units of host computers, so as to uniquely identify each job. An output condition 502 indicates the processing condition of each job. A job 503 indicates the job registered first, and its processing condition indicates that output of data corresponding to the job is in progress. A job 504 indicates a job condition in which the corresponding data has been analyzed, and is ready to output. A job 505 indicates a job condition in which the corresponding data is input from an input buffer, and its analysis is in progress. The conditions of these jobs are stored in an internal memory of the printer control unit 1001.

FIG. 23 shows an example of the contents of the status signal (/STS signal) when the condition change signal (/CCRT) signal is TRUE. When the /CCRT signal is TRUE, detailed information can be obtained by checking the contents of the status signal. A value 5A01 indicates that the power supply is scheduled to be turned off, a value 5A02 indicates that the paper size has changed, a value 5A03 indicates that the remaining paper quantity has changed, and a value 5A04 indicates that a warning has been produced. Values 5A05 to 5A08 are reserved.

The control procedure by the printer control unit 1001 will be described below with reference to the flow chart in FIG. 6. This procedure is also that of a program executed by the CPU 303 or 405 included in the printer control unit 1001.

When the power supply is turned on, execution of this program is started. When data arrives from the host computer at the input port of the printer, a reception buffer is allocated, and the data is stored in the buffer in step 602. In step 603, the input data is analyzed. In step 604, image data is developed from the received data, and is stored in the page buffer. In step 605, the generated contents of the page buffer are output to the printer engine 307 or 409. In step 606, it is checked if a condition change has occurred in the printer. If NO in step 606, the flow returns to step 603 to continue the processing. Condition changes of the printer can be checked based on the condition change signal (/CCRT signal) 223.

If a condition change has occurred, the condition of the printer engine is inquired using a command signal, and the status signal (/STS signal) as a response is read in step 614. In step 607, the contents of the condition change are checked, i.e., whether or not the contents indicate a power-OFF operation is confirmed by checking if the status signal 221 has the status value 5A01 shown in FIG. 23. If the status signal does not indicate a power-OFF operation, processing corresponding to the condition change indicated by the status signal 221 is executed in step 608. On the other hand, if the status signal indicates a power-OFF operation, it is checked instep 609 using the condition table shown in FIG. 5 if more data to be printed remains. If more data to be printed remains, i.e., if a job whose output state 502 indicates that corresponding data is being output, is ready to output, or is being received still remains, the job name 501 corresponding to the condition is stored in the RAM 305 in step 610.

In step 611, it is checked if the printer is connected to the network. In the case of the network in which packets are transferred at predetermined time intervals, whether or not the printer is connected to the network can be confirmed by checking if such packets are transferred. If the printer is connected to the network, information indicating that the power supply is scheduled to be turned off and including the job name corresponding to data that cannot be output due to the scheduled power-OFF event is supplied to the host computer which is connected to the network and uses this printer in step 612. Since the job name includes the identifier of the host computer corresponding to the generation source of that job, related job information can be supplied in units of host computers.

If the printer is not connected to the network, a power-off notice and information including the job name corresponding to data that cannot be output due to the scheduled power-OFF event is supplied to the host computer directly connected to that printer in step 613. As described above, the control of the engine control unit 233 actually turns off the power supply unit 234 upon completion of a series of these processing operations, thus ending the processing.

With the above-mentioned arrangement and processing procedure, immediately before the power supply of the printer is turned off, a power-off notice and information including a print job that cannot be executed due to the scheduled power-OFF event can be supplied to the host computer. Also, any temperature rise of the apparatus can be suppressed by driving the fan from when the scheduled power-OFF event is notified in advance until the power supply is turned off in practice.

Second Embodiment

In the first embodiment, when the power-OFF notice is received upon turning off the power switch, the print job is interrupted, and a message indicating that printing cannot be done is supplied to the host computer. However, in a printer which has a nonvolatile memory such as a hard disk, upon reception of the power-OFF notice, necessary data, i.e., the condition table shown in FIG. 5 may be stored in the hard disk. After the power supply is turned on again, information of a print job that could not be completed or the like may be output to the host computer on the basis of the stored condition table.

Figure 7:
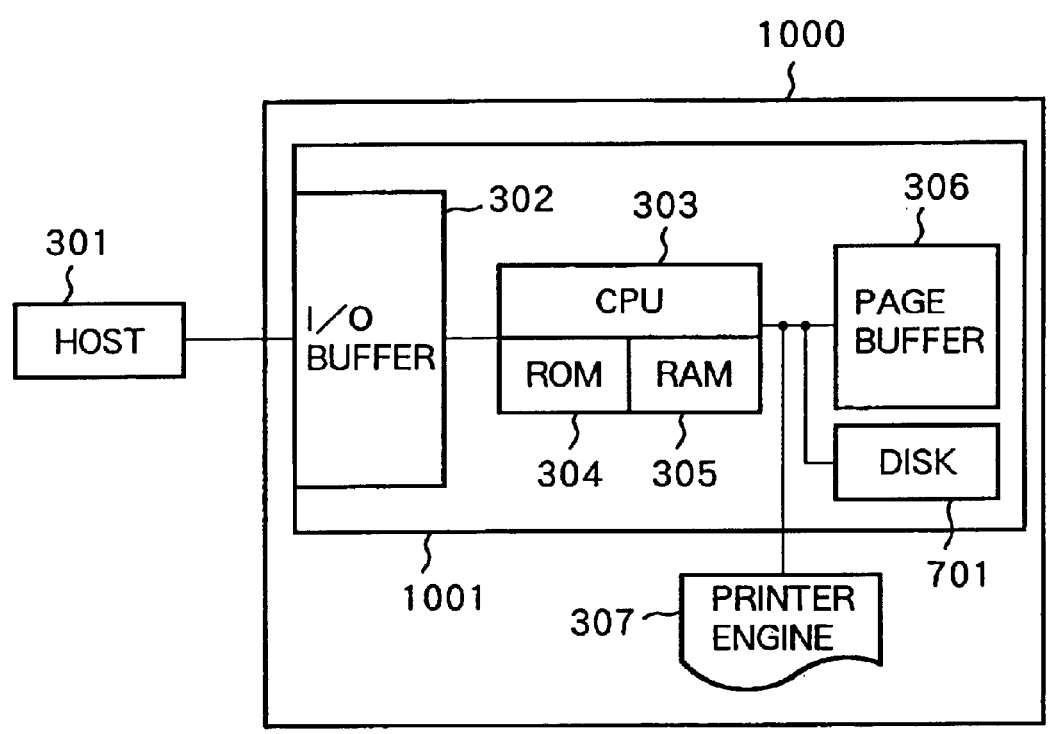
FIG. 7 is a block diagram showing a controller of the printing apparatus of the second embodiment.

FIG. 7 is a block diagram of the printer which comprises a hard disk 701. The arrangement except for the hard disk 701 is the same as that shown in FIG. 3.

Figure 8:
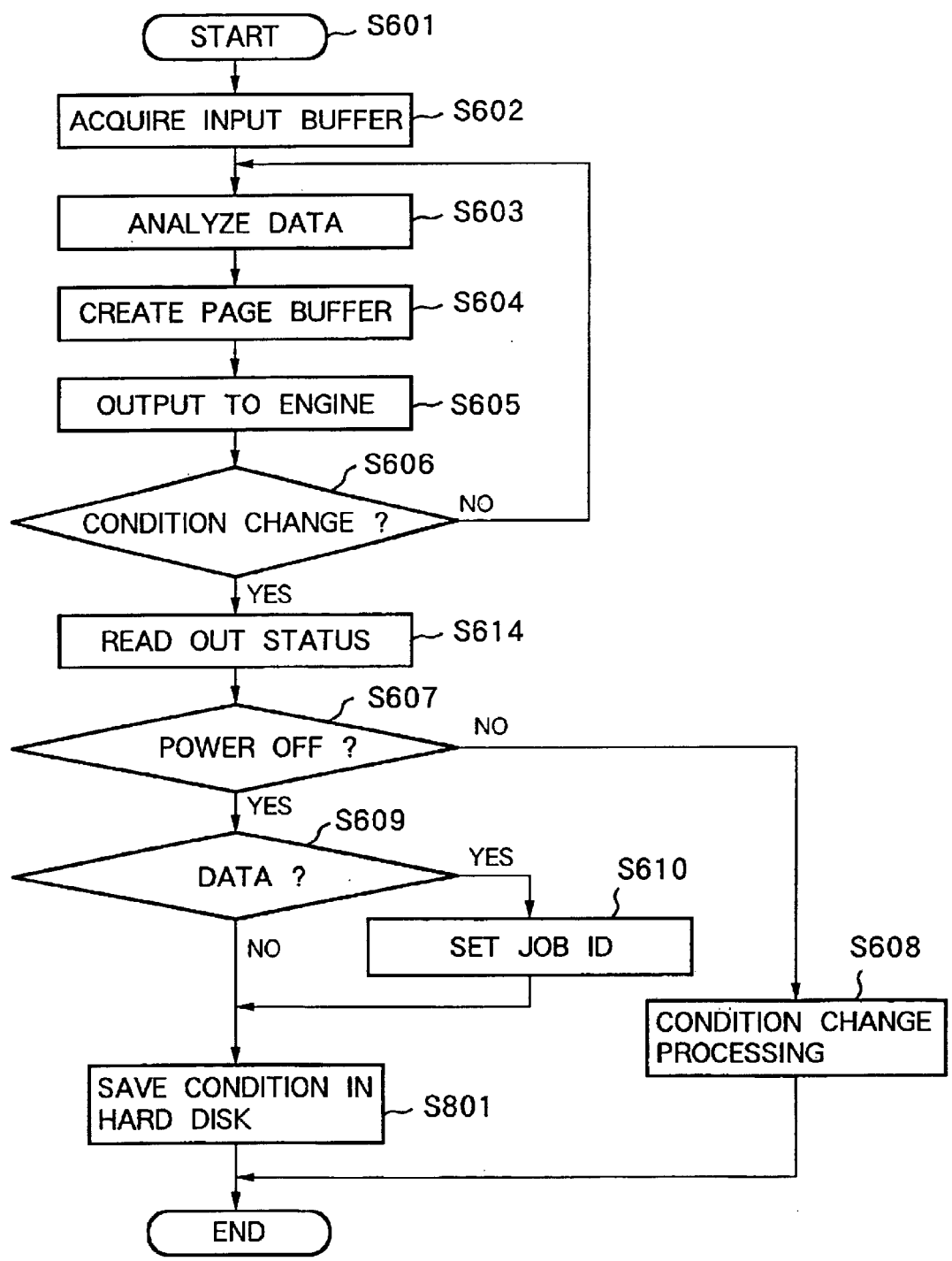
FIG. 8 is a flow chart showing the processing procedure of the printing apparatus of the second embodiment.

FIG. 8 is a flow chart showing the procedure of the program executed by the CPU 303 of the printer control unit 1001 with the arrangement shown in FIG. 7.

Figure 6:
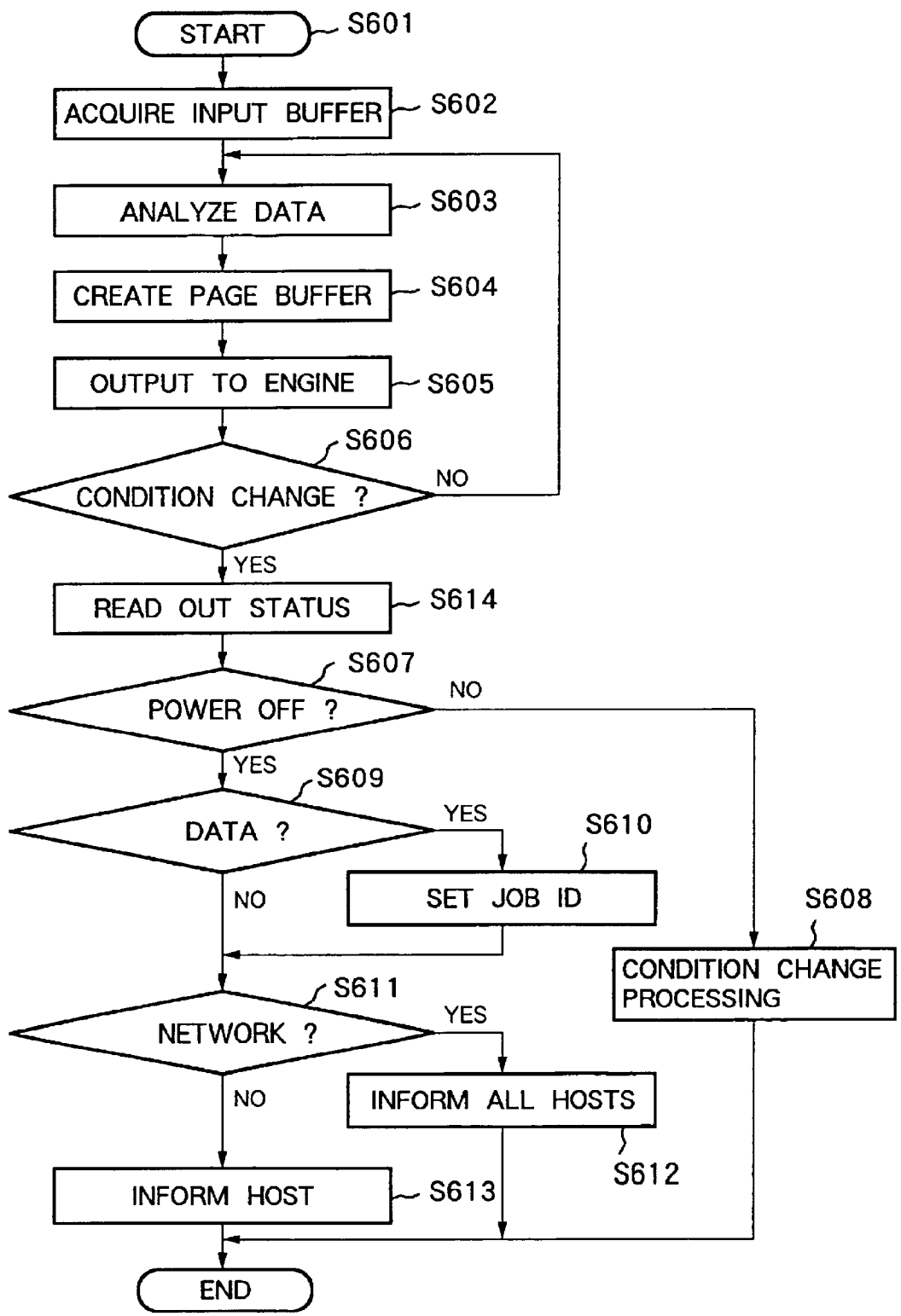
FIG. 6 is a flow chart showing the processing procedure of the printing apparatus of the first embodiment.

Steps 601 to 610, and step 614 are the same as those in FIG. 6, and a detailed description thereof will be omitted.

Assume that a condition change has been detected in step 606, a power-OFF notice is detected in step 607 by checking if the status signal (/STS signal) is status 5A01, and a print job is registered in the condition table (FIG. 5). In such case, the table itself is saved in the hard disk 701 in step 801. Thereafter, the power supply is actually turned off.

Figure 9:
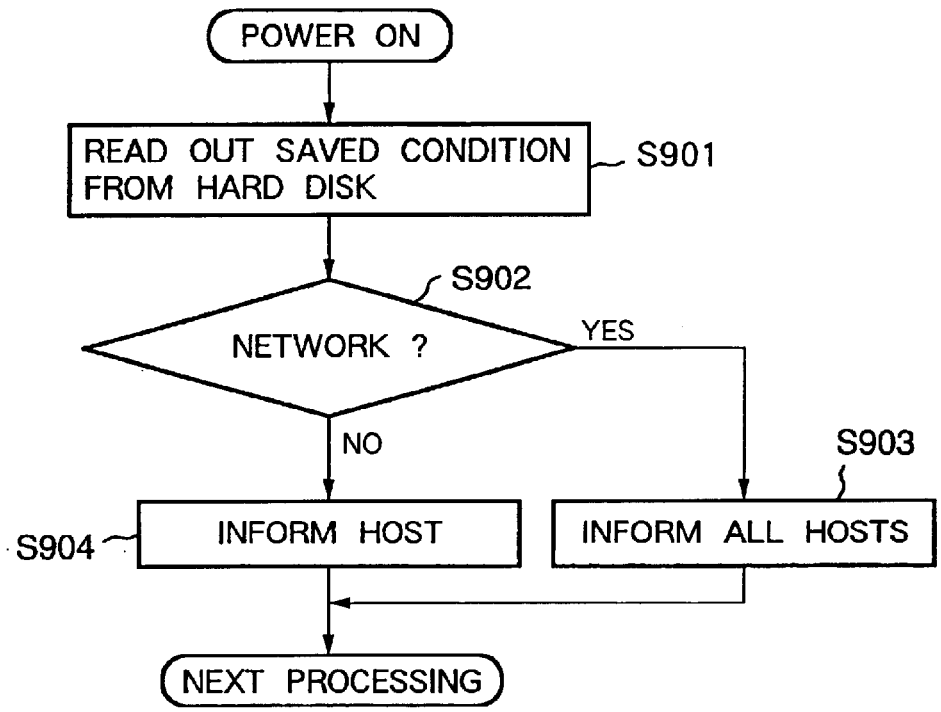
FIG. 9 is a flow chart showing the power-ON processing procedure of the printing apparatus of the first embodiment.

FIG. 9 shows the procedure when the power switch of the printer is turned on again. Upon completion of predetermined processing such as initialization or the like, the condition table saved in the hard disk 701 is read out in step 901. It is then checked in step 902 if the printer is connected to the network. If YES in step 902, information of the print job that could not be completed due to the power-OFF operation is transmitted to all the host computers on the network on the basis of the readout condition table (step 903). In this case, all the pieces of information may be sent to all the host computers. However, if associated information alone is supplied to the host computer as the generation source of a print job, unwanted communications can be avoided.

If the printer is not connected to the network, information of a job that could not be completed is supplied to the connected host computer in step 904.

Thereafter, normal power-ON processing continues.

With the above-mentioned procedure, when the power supply is turned off and is turned on again, the host computer can be informed of a print job that could not be completed due to the power-OFF operation. When the number of host computers connected is large as compared to the first embodiment, the number of processing steps to be executed between the power-OFF notice and actual power-OFF operation can be reduced, and processing can be completed within a short period of time.

Third Embodiment

As the third embodiment, a printer system which informs a host computer of changes in remaining paper quantity of a printer will be explained. The printer used in this embodiment is an LBP with the arrangement shown in FIG. 1.

Hence, a detailed description of the printer will be omitted.

Figure 11:
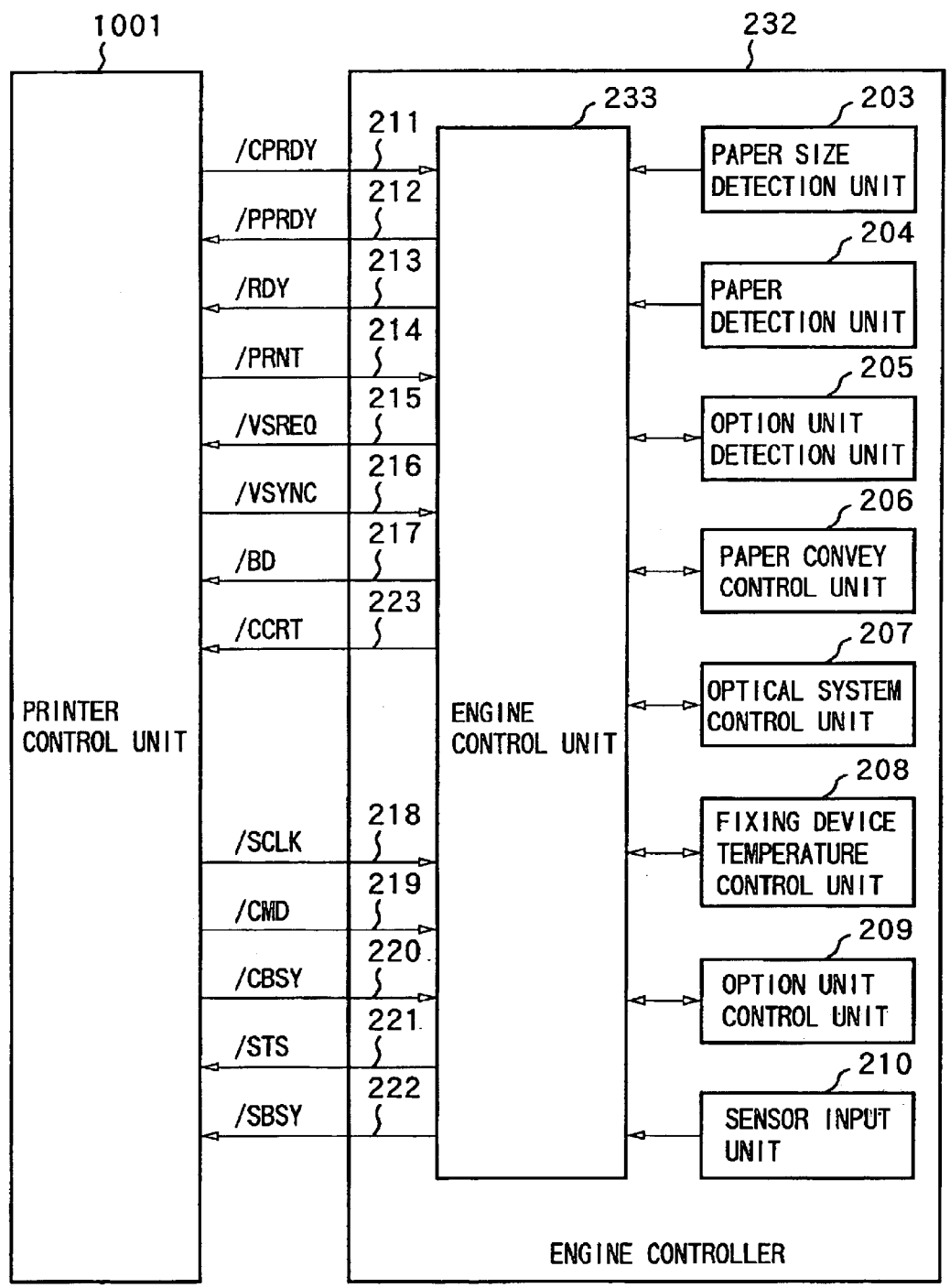
FIG. 11 is a block diagram showing a printer control unit of a printing apparatus of the third embodiment.

FIG. 11 is a block diagram of a printer control unit. The printer control unit has basically the same arrangement as that shown in FIG. 2. Referring to FIG. 11, a printer control unit 1001 receives image data via communications with a host computer, develops the received image data into information that can be printed by the printer, and exchanges signals with a printer engine control unit (to be described below) via serial communications.

An engine control unit 233 controls the individual units in a printer engine by exchanging signals with the printer control unit 1001 via serial communications. A paper size detection unit 203 detects the paper size in the cassette, and supplies the detected information to the engine control unit. A paper detection unit 204 detects the remaining paper quantities at the individual paper feed ports of the cassette, manual paper insertion port, option cassette, and envelope feeder, and supplies the detected information to the engine control unit 233. The remaining paper quantity detection may be attained by detecting an out-of-paper state using a single sensor. Alternatively, a plurality of microswitches and the like which are turned on/off in correspondence with the thicknesses of the remaining paper sheet stack may be arranged, and the number of remaining paper sheets may be roughly calculated based on the thickness detected by such switches. In this case, calculations and the like are performed by the engine control unit 233. In any case, at least an out-of-paper state is preferably detected precisely.

An option unit detection unit 205 checks the connection states of the individual option units such as the option cassette and envelope feeder. A paper convey control unit 206 performs paper convey control. An optical system control unit 207 controls an optical system such as a scanner motor, a laser, and the like. A fixing temperature control unit 208 performs temperature control, abnormality detection, and the like of a fixing device. An option unit control unit 209 issues operation instructions to the individual option units such as the option cassette and envelope feeder. A sensor input unit 210 includes a registration sensor, paper discharge sensor, double-sided printing sensor, reversal sensor, and the like for detecting the presence/absence of a paper sheet in the convey path.

Signals between the printer control unit 1001 and the engine control unit 233 will be explained below.

Reference numeral 211 denotes a /CPRDY signal indicating that the printer control unit 1001 is ready to communicate with the engine control unit 233; 212, a /PPRDY signal indicating the standby state in which the engine control unit 233 can communicate with the printer control unit 1001; 213, an /RDY signal indicating the standby state in which the engine control unit 233 is ready to print; 214, a /PRNT signal for issuing a print request from the printer control unit 1001 to the engine control unit 233; 215, a /VSREQ signal for requesting a vertical synchronization signal from the engine control unit 233 to the printer control unit 1001; 217, a /BD signal as a horizontal synchronization signal output from the engine control unit 233 to the printer control unit 1001; 218, an /SCLK signal as a synchronization clock signal for serial communications; 219, a /CMD signal as a command signal supplied from the printer control unit 1001 to the engine control unit 233; 220, a /CBSY signal as a strobe signal for outputting a command; and 221, an /STS signal indicating the internal status of an engine and output in response to a command from the printer control unit 1001. As shown in FIG. 23, if status information assumes a value 5A03, it is determined that the remaining paper quantity has changed. Furthermore, by checking the value (one of 5B01 to 5B08) of hierarchical status information in the lower layer, accurate information indicating that the remaining paper quantity corresponds to one of 90%, 70%, 50%, 25%, 10%, and 0% with respect to the full quantity can be obtained. Reference numeral 222 denotes an /SBSY signal for outputting status; and 223, a /CCRT (Condition Change Report) signal that goes "TRUE" when the contents of status that is not directly associated with the /RDY signal of those of the engine, to inform the printer control unit 1001 of the changes.

Figure 12:
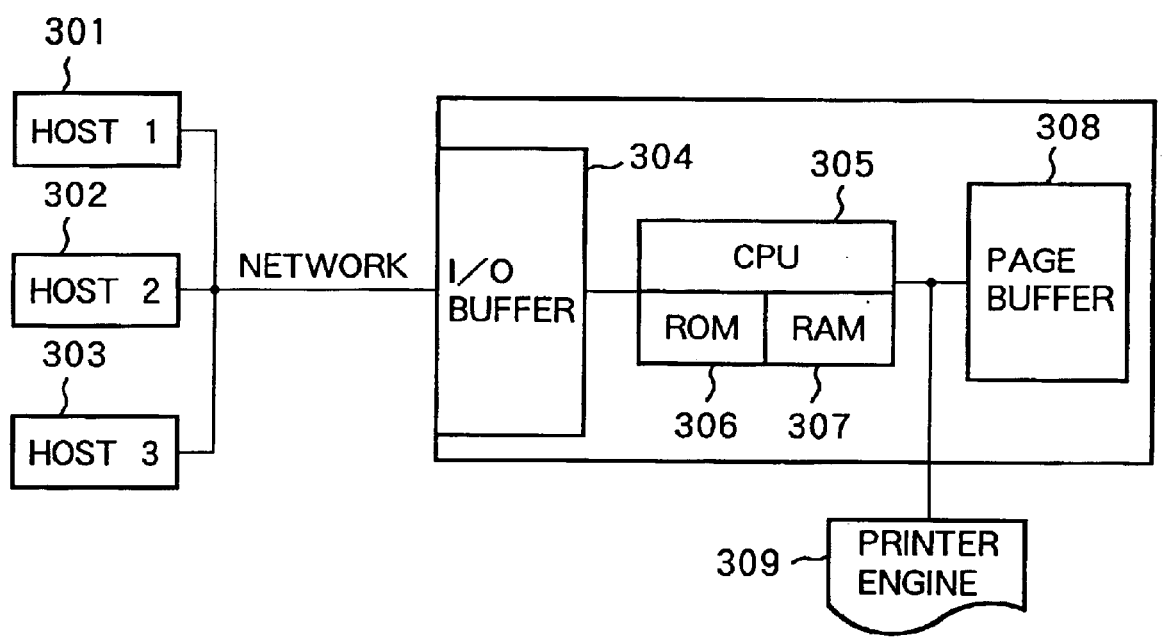
FIG. 12 is a block diagram showing a controller of a printing apparatus of the third embodiment.

FIG. 12 shows a block diagram of the LBP of this embodiment, and the relationship between the LBP and host computers as data generation sources. Note that reference numerals 304 to 308 denote constituting elements included in the printer control unit 1001 described above, and the arrangement of a printer engine 309 is as has been described above with the aid of FIG. 1.

Referring to FIG. 12, host computers 301, 302, and 303 serve as data sources connected to the network. An I/O buffer 304 temporarily stores I/O data to/from the individual data sources. A CPU 305 controls the printer control unit. A ROM 306 stores a program and font patterns. A RAM 307 serves as a work area. A page buffer 308 stores the developed image. The printer engine 309 actually prints. FIG. 13 is a job condition table showing an example of data conditions in the printer connected to the network. A job name 401 indicates a job ID. A processing condition 403 indicates that of each job. A network address 402 indicates an address of a host computer as the transmission source of each job on the network. If the printer is not connected to the network, the network address column 402 is blank. In the example shown in FIG. 13, three jobs 404 to 406 are being processed by the printer. The job 404 has a condition in which data corresponding to the job has been analyzed and its output is in progress. The job 405 has a condition in which the corresponding data has been received, and is ready to output. The job 406 has a condition in which the corresponding data is input from an input buffer, and its analysis is in progress. As can be seen from the network addresses of the individual jobs, these jobs were sent from the host computers having different addresses.

The procedure for notifying the host computer of the remaining paper quantity will be described below with reference to the flow chart in FIG. 14. The flow chart in FIG. 14 corresponds to the processing procedure executed by the printer control unit 1001.

Figure 14:
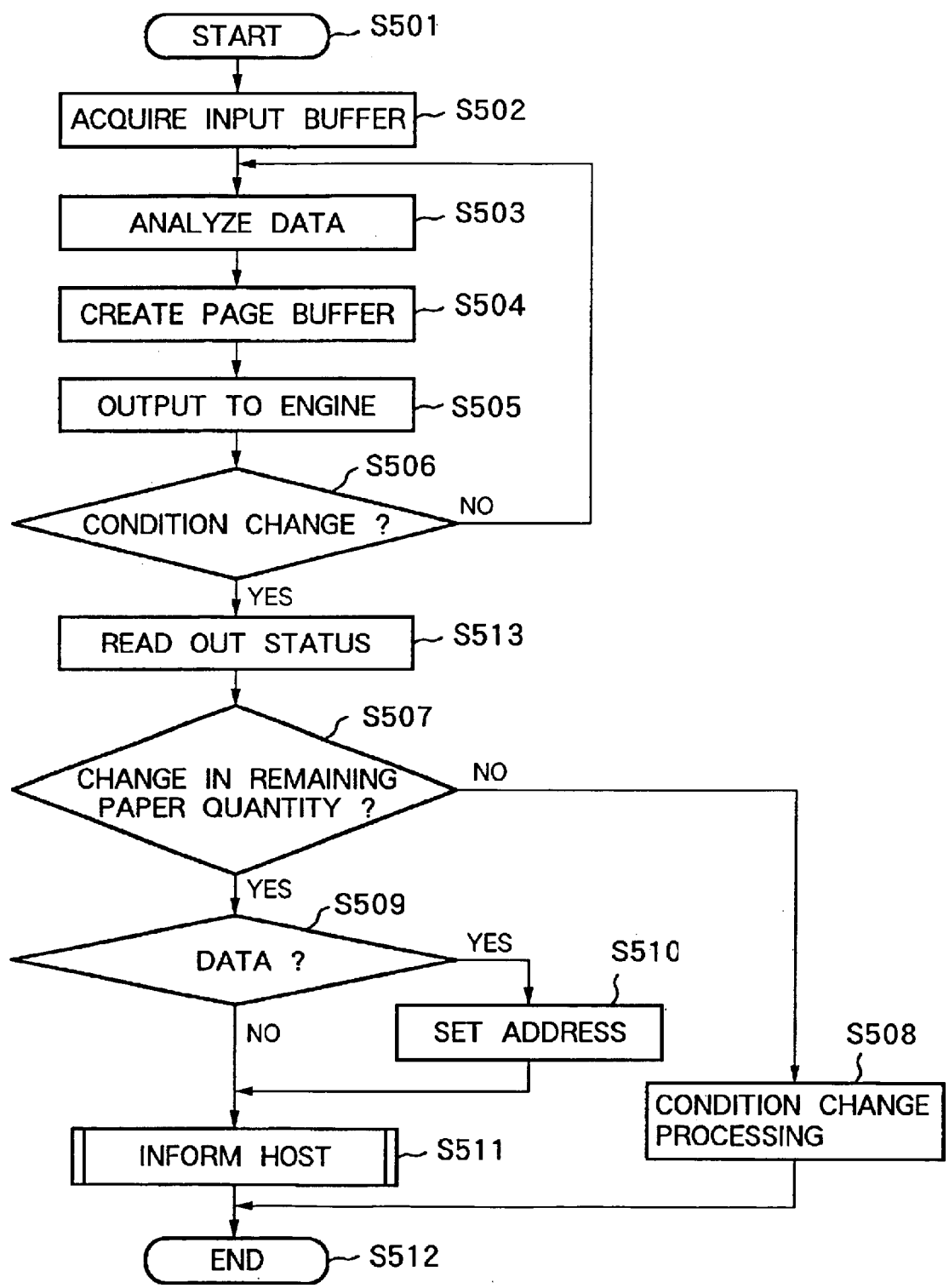
FIG. 14 is a flow chart showing the processing procedure of the printing apparatus of the third embodiment.

When the power supply is turned on, the program shown in FIG. 14 is started. A description of various initialization steps executed after the program is started is omitted here. When data arrives from the host computer on the network, a job name and an address of the host computer are registered in the job condition table with a processing condition "receiving data" in step 502. A reception buffer is allocated on the I/O buffer 304, and the received data is stored in the buffer. The input data is analyzed in step 503, and the contents of the page buffer are generated in step 504. In this stage, as for the job in progress, the contents in the processing condition column in the job condition table shown in FIG. 13 are changed to "ready to output". In step 505, the generated data is output to the engine. In this stage, the contents in the processing condition column of the job condition table are changed to "outputting". Upon completion of outputting, the completed job is deleted from the job condition table.

In step 506, whether or not the condition of the printer has changed is confirmed by checking if the condition change signal (/CCRT signal) 223 shown in FIG. 11 is "TRUE". If NO in step 506, the flow returns to step 503 to continue processing. However, if YES in step 506, the status signal 221 is read in step 513, and it is checked in step 507 if the read status signal is status 5A03 (FIG. 23) generated based on information detected by the paper detection unit 204. With this checking step, it is confirmed if the condition change has occurred due to changes in remaining paper quantity. As the changes in remaining paper quantity, at least an out-of-paper state is detected. Furthermore, the remaining quantity can be confirmed in more detail by checking status data 5B01 to 5B08 generated based on the detection signal of the paper detection unit 204, i.e., status data in the lower layer of status 5A03, as described above. If the condition change is not caused by changes in remaining paper quantity, processing associated with the corresponding condition change is executed in step 508.

If the remaining paper quantity has changed, it is checked in step 509 based on the job name 401 and processing condition 403 in the job condition table shown in FIG. 13 if print data remains. If it is determined based on the processing condition 403 in FIG. 13 that a job remains, the address written in the network address column 402 is stored in the RAM 307 in step 510. In step 511, the corresponding host apparatus is notified of changes in remaining paper quantity.

In this case, only the fact that the remaining paper quantity has changed may be notified. In addition, by checking the status values 5B01 to 5B08, the degree of changes in remaining paper quantity may be detected and notified. With this processing, more accurate information can be provided to the user.

Figure 15:
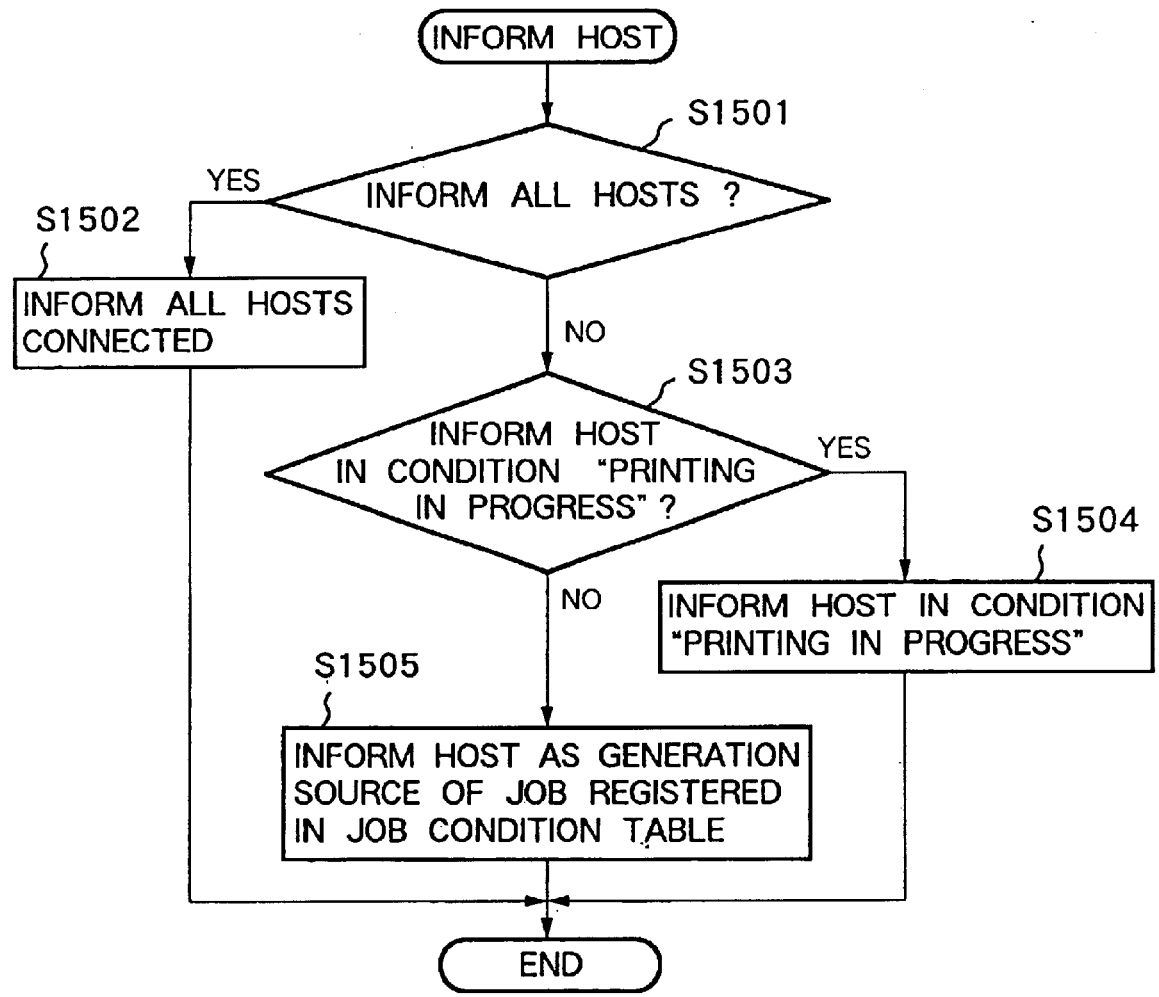
FIG. 15 is a flow chart showing the processing procedure of the printing apparatus of the third embodiment.

FIG. 15 shows the contents instep 511. If information is supplied to all the host computers connected to the network, all the host computers are notified in step 1502. On the other hand, if information is supplied to only a host computer that generated a job corresponding to the data whose output is in progress, only the host computer corresponding to "printing" as the contents of the processing condition column 404 in FIG. 13 is informed in step 1504. If information is also supplied to other host computers, i.e., those corresponding to job conditions "receiving data" and "ready to print", information is supplied to the host computers as the generation sources of the jobs registered in the job condition table, e.g., to the addresses of the jobs 404, 405, and 406 in FIG. 13, in step 1505.

When the power supply is turned off in step 512, the processing in FIG. 14 ends. Determination criteria in steps 1501, 1503, and 1505 are set by an operator via the printer main body or the host computer.

As described above, the host computer is informed of changes in remaining paper quantity, e.g., the number of remaining paper sheets, out-of-paper state, and the like, when such changes have taken place. For this reason, the host computer can detect changes in remaining paper quantity in real time. Note that the condition change to be informed is not limited to the remaining paper quantity. For example, information of the condition change to be supplied to the host computer is sent from the engine control unit 233 to the printer control unit 1001 using the /CCRT signal, and is then supplied from there to the host computer.

Furthermore, in this case, destination host computers can be selected from all the host computers, a host computer as a generation source of a job printing of which is in progress, and host computers including those as generation sources of pending jobs. For this reason, an increase in communication traffic due to the condition information can be suppressed.

In this embodiment, when the remaining paper quantity has changed, information is supplied to all the host computers or a host computer in use. However, information may be supplied by setting certain priority order.

Fourth Embodiment

As the fourth embodiment, a network system in which a host computer designates the types of condition changes of the printer, and when the designated condition change has occurred, the printer informs the host computer of it, will be described below. The printer itself used in this embodiment has the arrangement shown in FIGS. 1 and 11 as in the third embodiment, and a detailed description thereof will be omitted. Note that the contents of condition changes are those input to the engine control unit 233 shown in FIG. 11, i.e., include the paper size, the presence/absence of paper sheets, and the like detected by the blocks 203 to 210. Status data are shown in FIG. 23.

Figure 17:
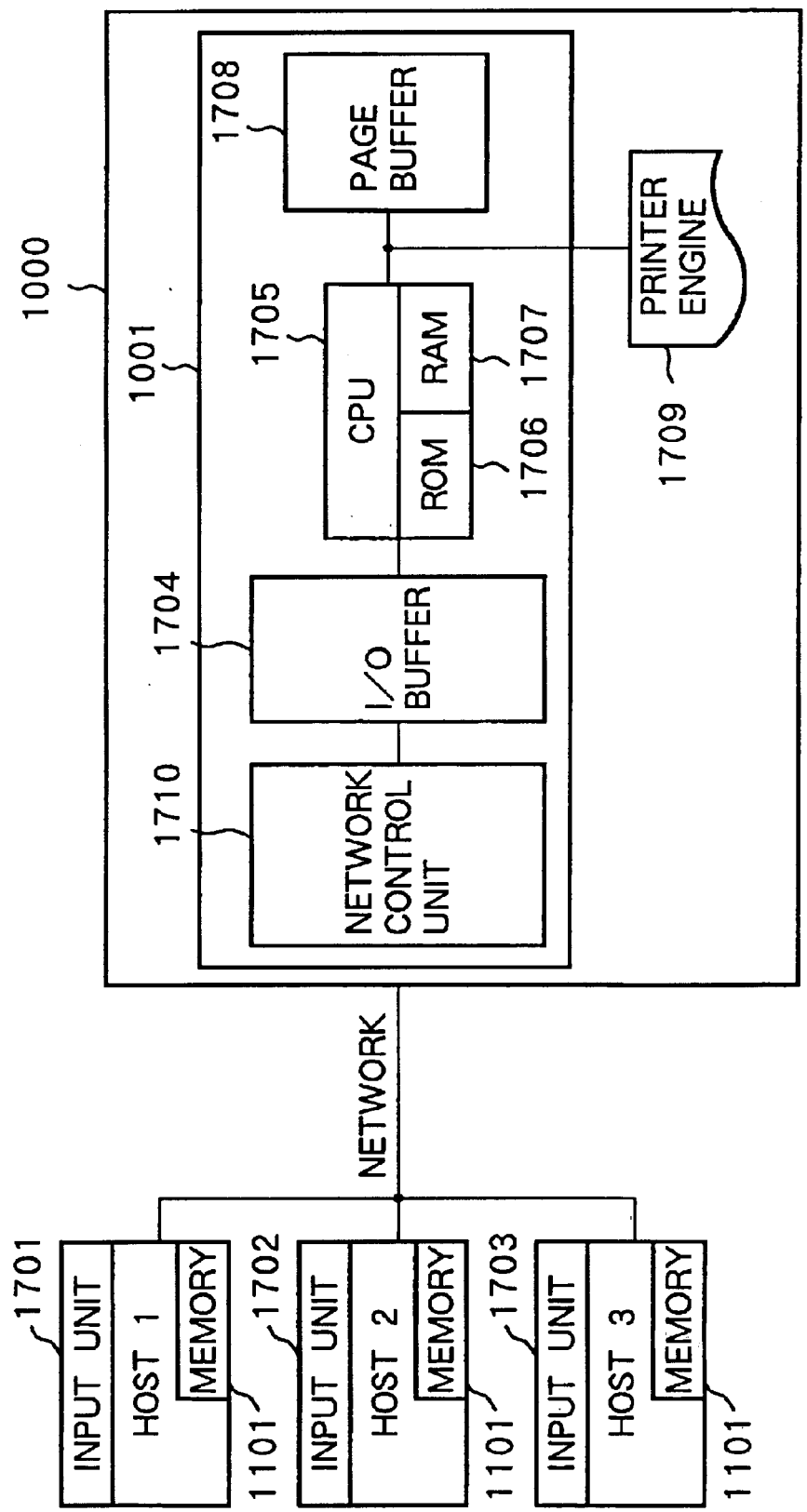
FIG. 17 is a block diagram showing a controller of a printing apparatus of the fourth embodiment.

FIG. 17 shows a block diagram of the LBP of this embodiment, and the relationship between the LBP and host computers as data generation sources. Note that reference numerals 1704 to 1708 and 1710 denote components included in the above-mentioned printer control unit 1001, and the arrangement of a printer engine 1709 is as has been described above with reference to FIGS. 1 and 2. Host computers 1701, 1702, and 1703 are those on the network, which serve as data sources. A network control unit 1710 comprises a network protocol, and serves as an interface with the network. An input buffer 1704 temporarily stores I/O data to/from the individual data sources. A CPU 1705 controls the print control unit. A ROM 1706 stores a program and font patterns. A RAM 1707 serves as a work area. A page buffer 1708 stores the developed image. The printer engine 1709 actually prints.

FIG. 13 shows the data conditions in the printer connected to the network. Since the contents shown in FIG. 13 are the same as those in the third embodiment, a detailed description thereof will be omitted.

Figure 18:
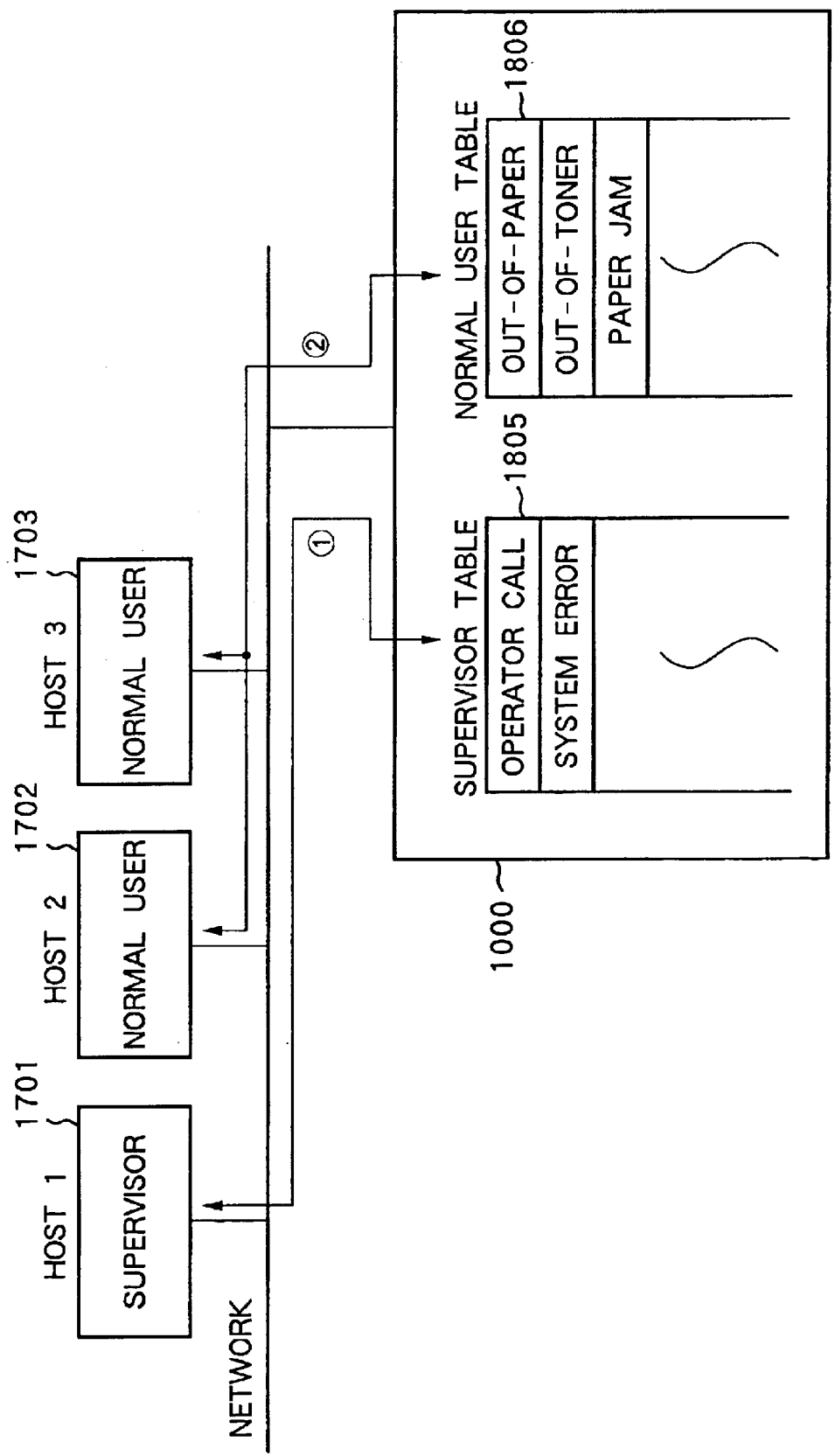
FIG. 18 depicts the designation states of tables of a printer in the fourth embodiment.

FIG. 18 shows an example wherein the host computer 1701 for a supervisor, the host computers 1702 and 1703 for normal users, and a printer 1000 are connected to the network. The printer 1000 stores a table 1805 that stores items of error information designated by the host computer 1701 of the supervisor, and a table 106 that stores items of information designated by the host computers 1702 and 1703 of the normal users. These tables store items of information designated by the host computers, and when the condition of the printer has changed, these tables are looked up. In this case, if the changed condition matches one of the items registered in the table, the host computer is informed of that condition change. The control procedure in this embodiment will be described below with reference to the flow charts in FIGS. 19, 20, and 21.

Figure 19:
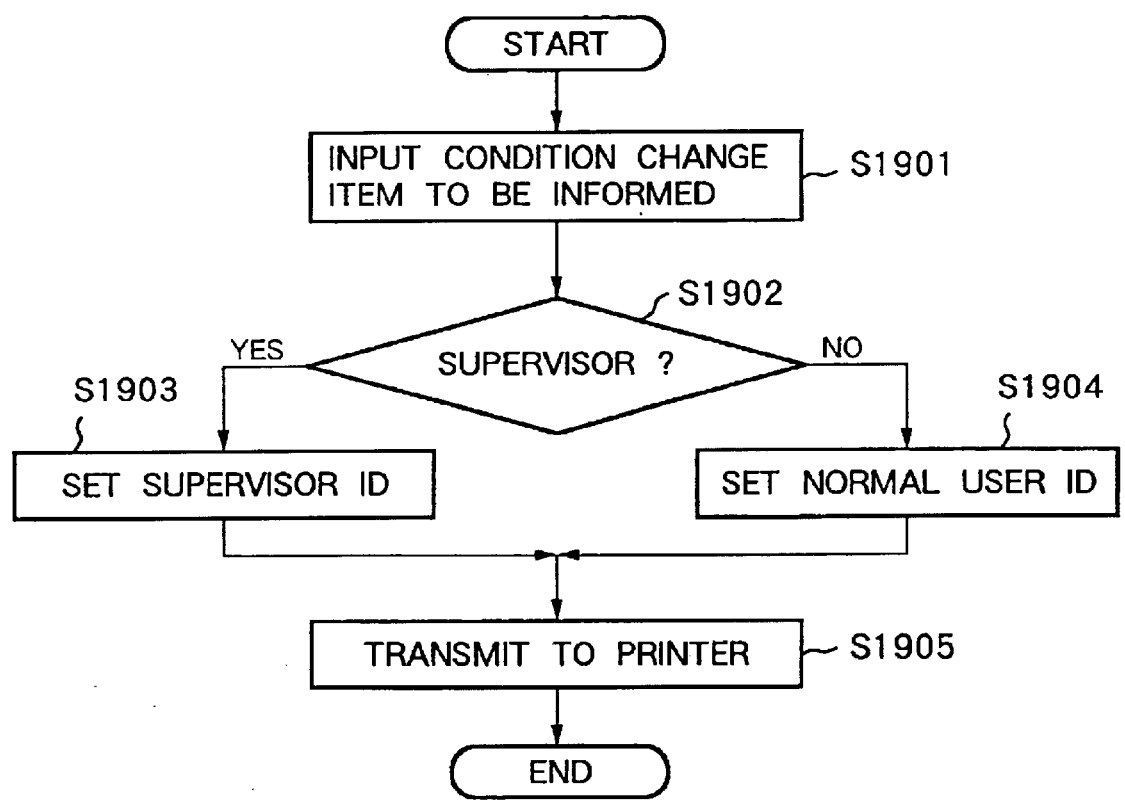
FIG. 19 is a flow chart showing the procedure for designating items of condition changes from a host computer to the printer in the fourth embodiment.

A sequence for instructing designation of items of condition changes of the printer from the host computer will be described below with reference to FIG. 19. Note that such control is executed by a CPU (not shown) in the host computer on the basis of a program stored in a memory 1101 (FIG. 17) in the host computer. The memory 1101 may comprise either a ROM or RAM. When the memory 1101 comprises a RAM, the program is supplied from an external device to the host computer via an FD, CD-ROM, network, or the like.

When the host computer designates items of the conditions, the operator inputs designations of items of condition changes to be informed, and the input items are stored (step S1901). For example, if only generation of a warning corresponding to status 5A04 shown in FIG. 23 is to be informed, that status value 5A04 is designated. After the items are registered, it is checked if the host computer of interest is that of the network supervisor (step S1902). If YES in step S1902, a supervisor ID is used (step S1903); otherwise, a normal user ID is used (S1904), and the input items of condition changes are transmitted to the printer together with the host ID (step S1905).

Figure 20:
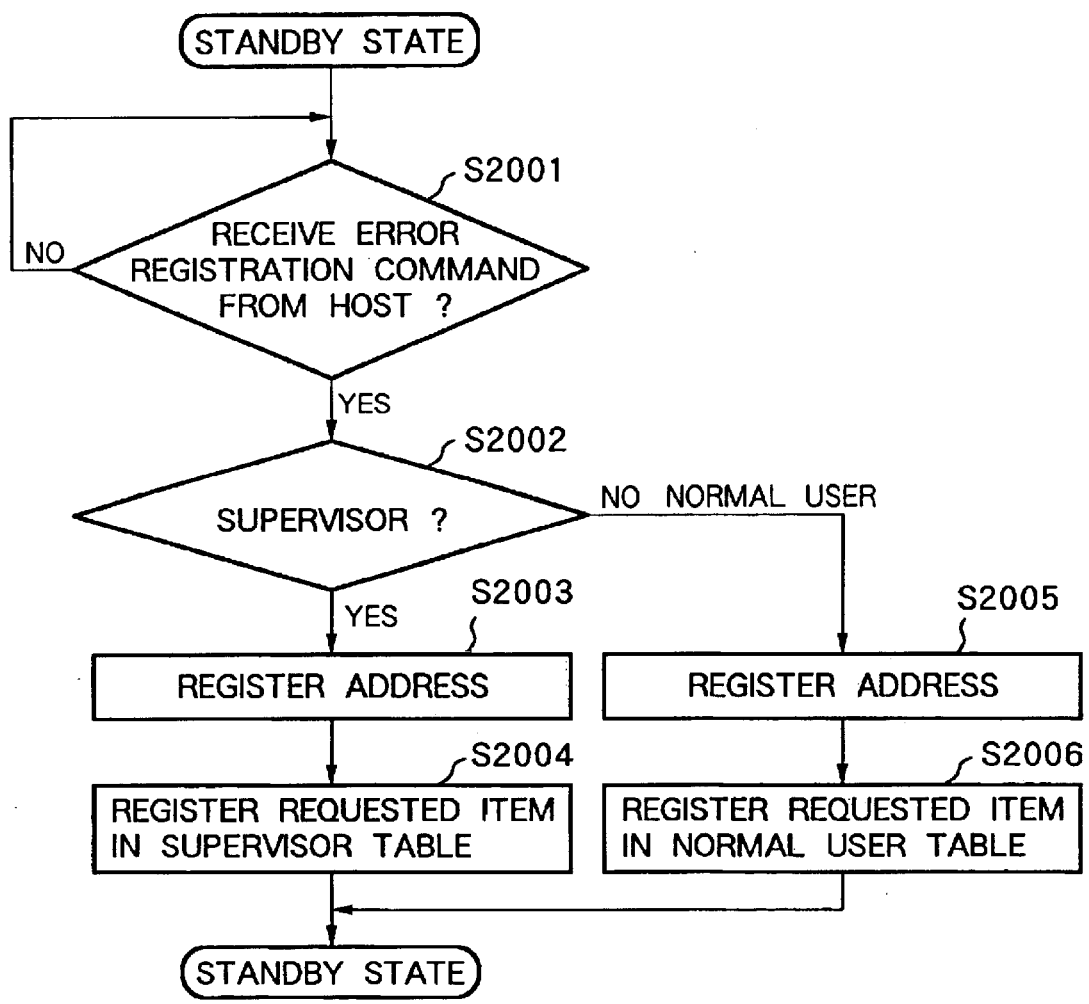
FIG. 20 is a flow chart showing the procedure for setting the items of condition changes designated by the host computer in a table.

FIG. 20 is a flow chart showing the processing sequence in the printer when the items of condition changes are designated. If it is determined in step S2001 that a registration command of a condition change item is received from the host computer, the flow advances to step S2002 to check if the command issuer is the supervisor or normal user. If the command issuer is the supervisor, the flow advances to step S2003; otherwise, the flow advances to step S2005. In step S2003, the address of the supervisor is registered on the RAM 1707 and is added to the table 1805. If no table is present, a table is created, and the flow advances to step S2004. In step S2004, the designated condition change item is registered in the table 1805 for the supervisor on the RAM 1707, and the control returns to the standby state.

On the other hand, in step S2005, the address of the host computer of the normal user is registered on the RAM 1707 and is added to the table 1806. If no table is present, a table is created, and the flow advances to step S2006. In step S2006, the designated condition change item is registered in the table 1806 for the normal user on the RAM 1707, and the control returns to the standby state.

Figure 21:
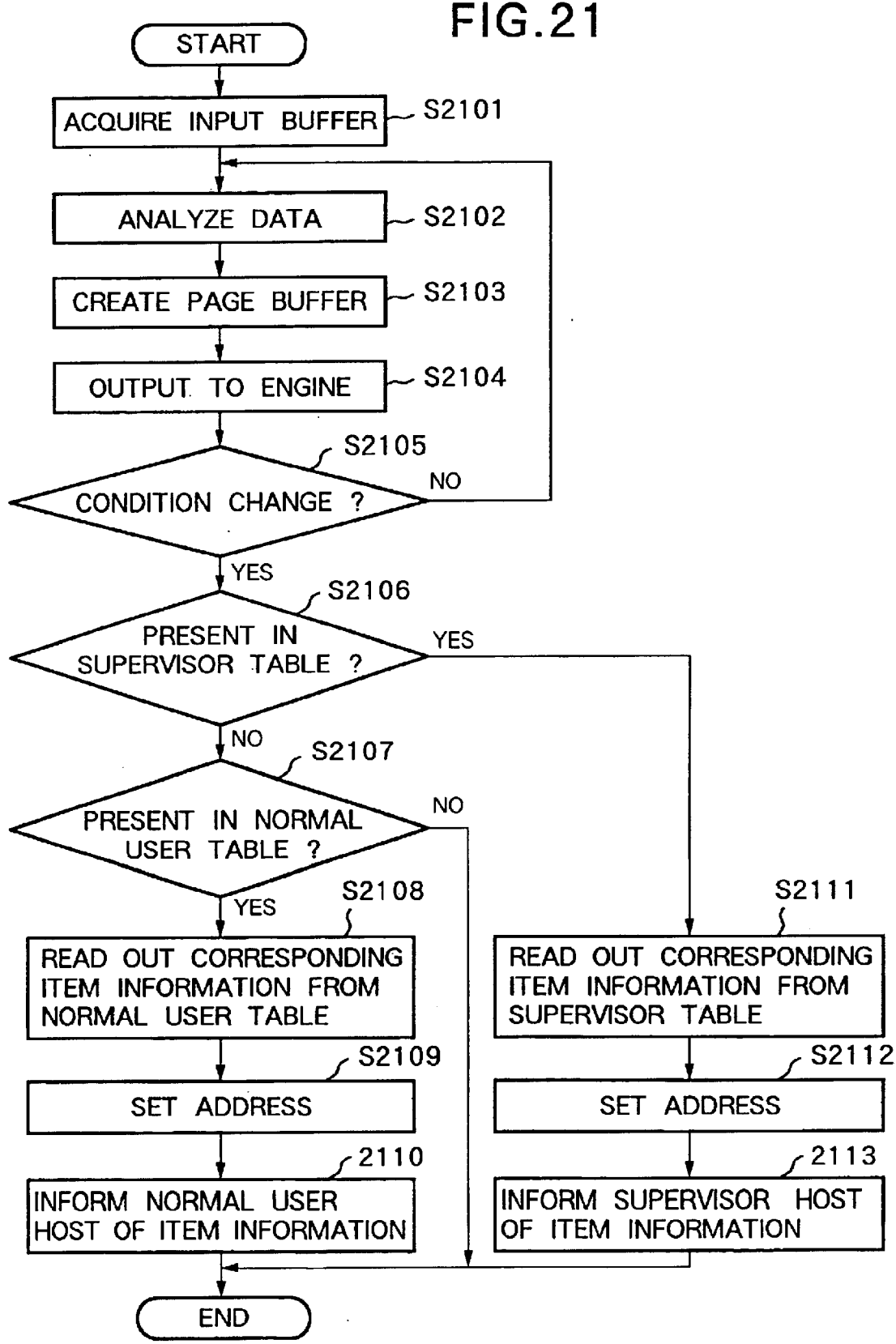
FIG. 21 is a flow chart showing the processing procedure upon detecting condition changes during printing of the printer of the fourth embodiment.

A sequence executed when the condition of the printer 1000 has changed during printing will be described below with reference to FIG. 21. This sequence is done by executing the program stored in the ROM 306 by the CPU 305.

When data arrives from the host computer on the network, a reception buffer is allocated and the data is stored in the buffer in step S2101. In step S2102, the input data is analyzed. In step S2103, the contents of the page buffer are generated. In step S2104, the generated contents of the page buffer are output to the engine. It is confirmed in step S2105 if a condition change of the printer has taken place. If NO in step S2105, the flow returns to step S2102. The presence/absence of condition changes is confirmed by checking the condition change signal (/CCRT) 223. The checking process has already been described in the above embodiments with the aid of FIGS. 8 and 14, and a detailed description thereof will be omitted.

When a condition change has taken place, the flow advances to step S2106 to check if the contents of the condition change correspond to the item registered in the supervisor table 1805. If the corresponding condition change is not registered, the flow advances to step S2107 to check if the contents of the condition change correspond to the item registered in the normal user table 1806.

If YES in step S2107, the flow advances to step S2108 to read out the corresponding condition change item from the normal user table 1806. Thereafter, the flow advances to step S2109. In step S2109, the address of the host computer of the normal user is set as the destination address of the condition. In step S2110, the host computer of a normal user as the destination is informed of the condition change of the registered item, thus ending the processing. If it is determined in step S2107 that the condition change is not registered in the normal user table 1806, either, the flow ends.

If it is determined in step S2106 that the condition change is registered in the supervisor table, the flow advances to step S2111. In step S2111, the corresponding condition change item is read out from the supervisor table, and the flow advances to step S2112. In step S2112, the address of the host computer of the supervisor is set as the destination address of the condition, and the flow advances to step S2113. In step S2113, the host computer of the supervisor as the destination is informed of the condition change of the registered item, thus ending the processing.

With the above-mentioned procedure, when a condition change has occurred on the printer engine side, the host computer connected to the network can be quickly informed of such condition change. When the host computer designates the condition change items to be detected, it can be informed of only the designated items, and can take a quick measure against changes in the printer condition. Furthermore, since the condition change items can be stored in correspondence with the supervisor and normal users depending on their contents, an unwanted condition change can be prevented from being sent to the host computer, resulting in convenience for the user.

Also, of the hierarchical structure shown in FIG. 23, the level to be informed may be designated. For example, the user may designate to inform of only the fact of changes in remaining paper quantity or to inform of the actual remaining paper quantity (e.g., 70%).

Other Embodiments

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Figure 10:
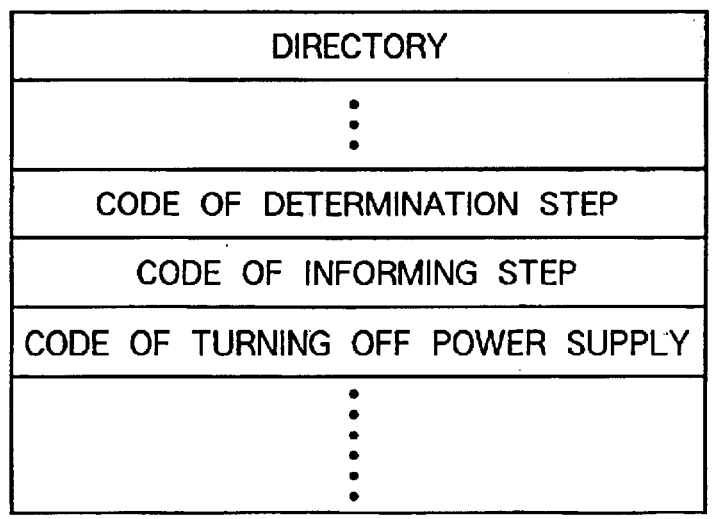
FIG. 10 shows a memory map which stores the program of the processing procedure by the printing apparatuses of the first and second embodiments.

When the present invention is applied to the storage medium, the storage medium stores program codes corresponding to the above-mentioned flow charts. This will be briefly described below. That is, the storage medium stores modules shown in a memory map example of FIG. 10.

That is, the storage medium need only store program codes of at least a code module of the determination step of determining based on a signal indicating that a condition of a printing apparatus has changed if the changed condition corresponds to a power-OFF notice signal, a code module of the informing step of supplying information indicating that a power supply is scheduled to be turned off to the host apparatus when it is determined in the determination step that the changed condition corresponds to the power-OFF notice signal, and a code module of the control step of controlling to turn off the power supply after the information is supplied in the informing step.

Figure 16:
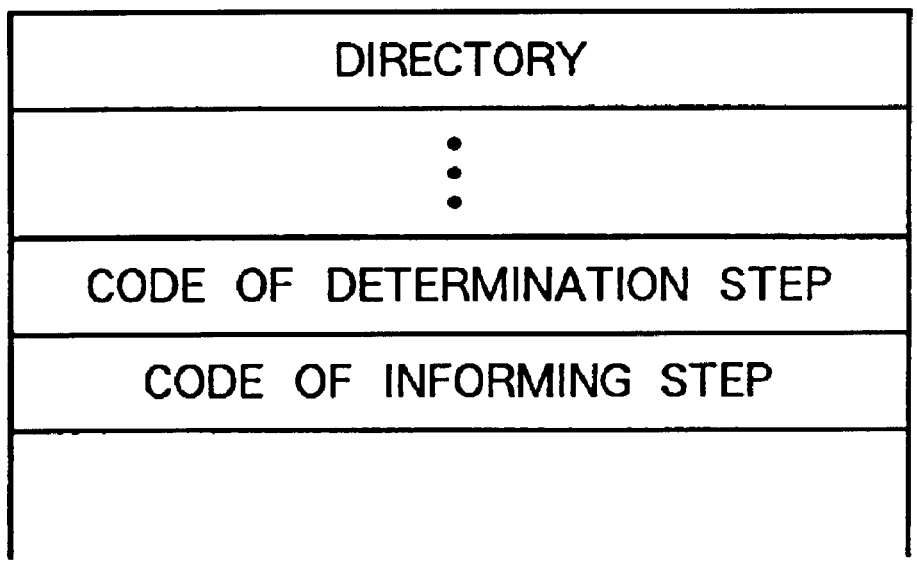
FIG. 16 shows a memory map of the program that realizes the processing procedure by the printing apparatus of the third embodiment.

Alternatively, the storage medium stores modules shown in a memory map example of FIG. 16.

More specifically, the storage medium need only store program codes of at least a code module of the determination step of determining based on a signal indicating that a condition of a printing apparatus has changed if the changed condition corresponds to changes in remaining paper quantity, and a code module of the informing step of informing the host apparatus of the changes in remaining paper quantity when it is determined in the determination step that the changed condition corresponds to the changes in remaining paper quantity.

Figure 22:
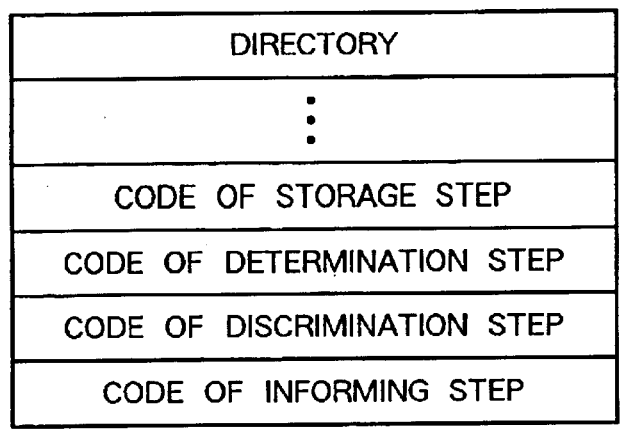
FIG. 22 shows a memory map of the program that realizes the processing procedure of the fourth embodiment.

Alternatively, the storage medium stores modules shown in a memory map example of FIG. 22.

More specifically, the storage medium need only store program codes of at least a code module of the storage step of storing condition change items designated by a host apparatus, a code module of the determination step of determining, based on a signal indicating that a condition of a printing apparatus has changed, an item of the changed condition, a code module of the discrimination step of discriminating with reference to the items stored in the storage step if the item determined in the determination step corresponds to the item stored in the storage step, and a code module of the informing step of informing the host apparatus that designated the corresponding item of the condition change item which is discriminated in the discrimination step to correspond to the items stored in the storage step.

As described above, the printing apparatus and its control method according to the present invention can supply a power-OFF notice to a host apparatus, and can inform the host apparatus of data that cannot be printed.

Upon reception of a condition change signal from the printer engine, it is recognized that the remaining paper quantity has changed. For this reason, information indicating that the remaining paper quantity has changed can be quickly supplied to the host apparatus connected to the network.

Also, since a host apparatus to receive that information can be selected as needed, the communication traffic can be reduced.

Furthermore, the printer engine can quickly supply a condition change signal to the host apparatus connected to the network.

Moreover, since the host apparatus can designate condition change items to be detected, high-speed processing of a utility is attained.

In addition, since condition change items can be stored in correspondence with a supervisor and a normal user depending on their contents, the utility of the host apparatus becomes effective for the user.

The present invention is not limited to the above embodiments and various changes and modifications can be made within the spirit and scope of the present invention. Therefore, to apprise the public of the scope of the present invention, the following claims are made.

What is claimed is:

1. A print controlling apparatus for controlling a printing unit to print data corresponding to a print job, comprising:

reception means for receiving from the printing unit a signal indicating that a condition of the printing unit has changed;

condition acquisition means for acquiring the condition of the printing unit in response to the signal;

determination means for determining based on the acquired condition whether a change in the condition of the printing unit corresponds to a power-OFF notice; and informing means for informing an external apparatus that a power supply is scheduled to be turned off when said determination means determines that the change in the condition of the printing unit corresponds to the power-OFF notice, wherein when said determination means determines that the change in the condition of the printing unit corresponds to the power-OFF notice, the power supply is turned off after said informing means informs the external apparatus that the power supply is scheduled to be turned off.

2. The apparatus according to claim 1, further comprising condition holding means for holding information of the print job, and wherein the information informed from said informing means includes information of the print job held by said condition holding means.

3. The apparatus according to claim 1, wherein plural external apparatuses are connected via a communication network, and said informing means informs all connected external apparatuses.

4. The apparatus according to claim 1, wherein said determination means makes its determination based on contents of the condition acquired by said condition acquisition.

5. A print controlling method for controlling a printing unit to print data corresponding to a print job, comprising:

a reception step of receiving from the printing unit a signal indicating that a condition of the printing unit has changed;

a condition acquisition step of acquiring the condition of the printing unit in response to the signal;

a determination step of determining based on the acquired condition whether a change in the condition of the printing unit corresponds to a power-OFF notice; and an informing step of informing an external apparatus that a power supply is scheduled to be turned off when said determination step determines that the change in the condition of the printing unit corresponds to the power-OFF notice, wherein when it is determined in said determination step that the change in the condition of the printing unit corresponds to the power-OFF notice, the power supply is turned off after said informing step informs the external apparatus that the power supply is scheduled to be turned off.

6. The method according to claim 5, further comprising a condition holding step of holding information of the print job, and wherein the information informed in the informing step includes information of the print job held in the condition holding step.

7. The method according to claim 5, wherein plural external apparatuses are connected via a communication network, and the informing step includes a step of informing all connected external apparatuses.

8. The method according to claim 5, wherein the determination step makes its determination based on contents of the condition acquired in said condition acquisition step.

9. A computer program product loadable into an internal memory of a digital computer for controlling a printing unit to print data corresponding to a print job, comprising program code portions for performing the steps of:

receiving from the printing unit a signal indicating that a condition of the printing unit has changed;

acquiring the condition of the printing unit in response to the signal;

determining based on the acquired condition whether a change in the condition of the printing unit corresponds to a power-OFF notice; and informing an external apparatus that a power supply is scheduled to be turned off when it is determined that the change in the condition of the printing unit corresponds to the power-OFF notice, wherein when it is determined that the change in the condition of the printing unit correspond to the power-OFF notice, the power supply is turned off after the external apparatus is informed that the power supply is scheduled to be turned off.

* * * * *

UNITED STATES PATENT AND TRADEMARK OFFICE
CERTIFICATE OF CORRECTION

PATENT NO. : 6,977,739 B2 Page 1 of 1
APPLICATION NO. : 08/909966
DATED : December 20, 2005
INVENTOR(S) : Yuichi Higuchi et al.

It is certified that error appears in the above-identified patent and that said Letters Patent is hereby corrected as shown below:

<u>Column 9,</u>
Line 34, "instep" should read -- in step --.

<u>Column 13,</u>
Line 32, "instep" should read -- in step --.

<u>Column 20,</u>
Line 10, "correspond" should read -- corresponds --.

Signed and Sealed this

Twentieth Day of June, 2006

JON W. DUDAS
*Director of the United States Patent and Trademark Office*